US012627614B2

(12) United States Patent
Liu et al.

(10) Patent No.:  US 12,627,614 B2
(45) Date of Patent:  May 12, 2026

(54) DATA FORWARDING METHOD, DATA BUFFERING METHOD, APPARATUS, AND RELATED DEVICE

(71) Applicant: Huawei Technologies Co., Ltd., Shenzhen (CN)

(72) Inventors: Shixing Liu, Beijing (CN); Yinben Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1009 days.

(21) Appl. No.: 17/835,266

(22) Filed: Jun. 8, 2022

(65) Prior Publication Data

US 2022/0303217 A1    Sep. 22, 2022

Related U.S. Application Data

(63) Continuation of application No. PCT/CN2020/115582, filed on Sep. 16, 2020.

(30) Foreign Application Priority Data

Dec. 9, 2019    (CN) .......................... 201911249818.6

(51) Int. Cl.
| | |
|---|---|
| *H04L 47/625* | (2022.01) |
| *H04L 47/10* | (2022.01) |
| *H04L 47/2483* | (2022.01) |
| *H04L 47/62* | (2022.01) |

(52) U.S. Cl.
CPC .......... *H04L 47/6255* (2013.01); *H04L 47/10* (2013.01); *H04L 47/2483* (2013.01); *H04L 47/62* (2013.01)

(58) Field of Classification Search
CPC . H04L 47/6255; H04L 47/10; H04L 47/2483; H04L 47/62
See application file for complete search history.

(56) References Cited

U.S. PATENT DOCUMENTS

| | | | |
|---|---|---|---|
| 2016/0173383 A1 | 6/2016 | Liu et al. | |
| 2020/0186471 A1 | 6/2020 | Shen et al. | |
| 2021/0297354 A1* | 9/2021 | Zemach | ................ H04L 47/722 |

FOREIGN PATENT DOCUMENTS

| | | | |
|---|---|---|---|
| CN | 1536820 | A | 10/2004 |
| CN | 108667739 | A | 10/2018 |
| CN | 109412964 | A | 3/2019 |
| CN | 110493145 | A | 11/2019 |
| EP | 3206131 | A1 | 8/2017 |

OTHER PUBLICATIONS

Prateesh Goyal et al "Backpressure Flow Control," Mar. 2, 2020, XP081611484, 16 pages.

* cited by examiner

*Primary Examiner* — Siming Liu
(74) *Attorney, Agent, or Firm* — Conley Rose, P.C.

(57) ABSTRACT

A data forwarding method includes, after congestion of an egress queue is relieved, a network device that receives a packet from an upstream node, and determines whether a storage device associated with the egress queue buffers a previous packet that belongs to a same data flow as the packet. When the storage device does not buffer the previous packet, the network device schedules the packet to the egress queue, to forward the packet to a downstream node, where the storage device is configured to receive, during congestion of the egress queue, a packet sent by the network device.

12 Claims, 18 Drawing Sheets

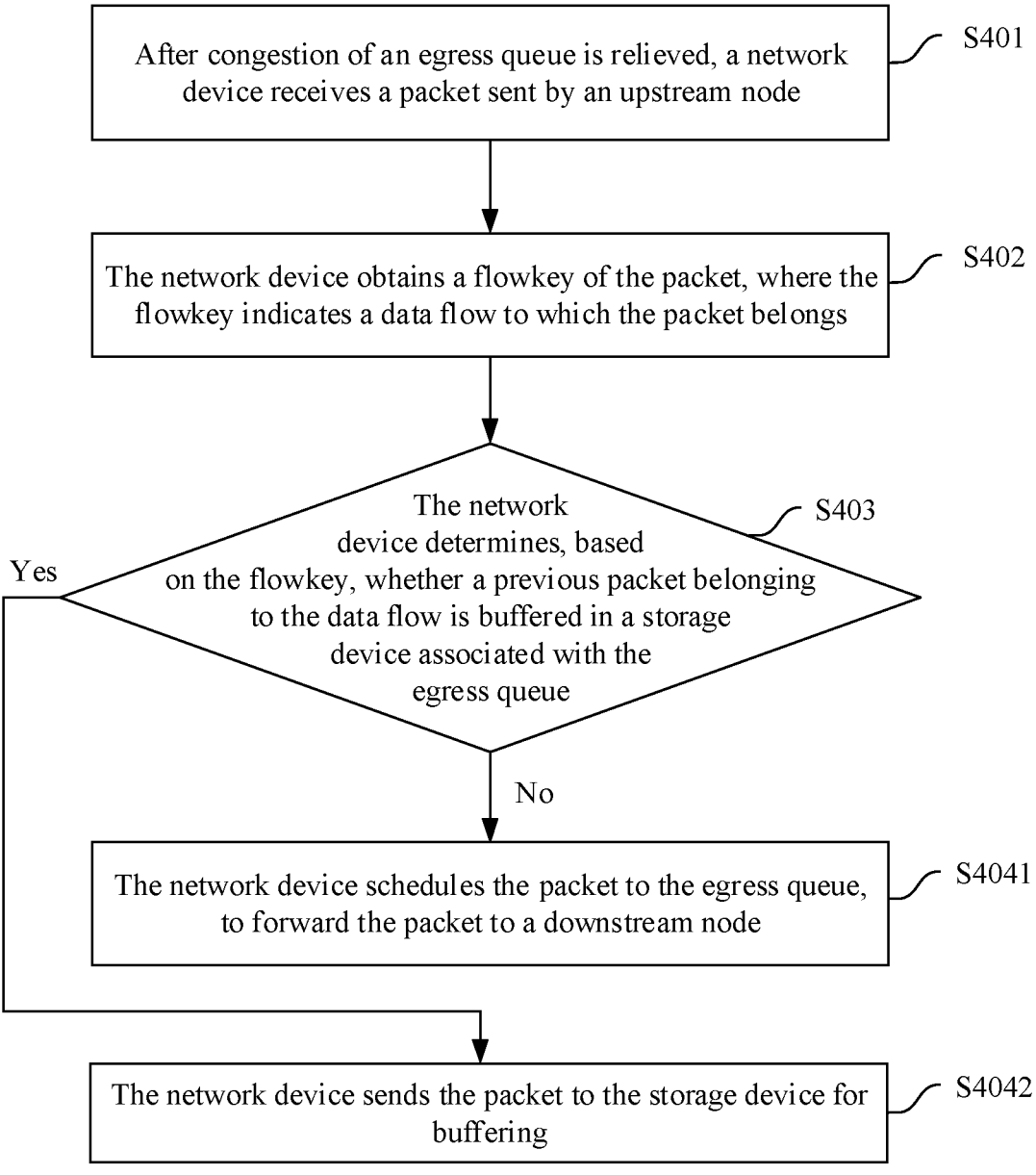

After congestion of an egress queue is relieved, a network device receives a packet sent by an upstream node — S401

The network device obtains a flowkey of the packet, where the flowkey indicates a data flow to which the packet belongs — S402

The network device determines, based on the flowkey, whether a previous packet belonging to the data flow is buffered in a storage device associated with the egress queue — S403

Yes

No

The network device schedules the packet to the egress queue, to forward the packet to a downstream node — S4041

The network device sends the packet to the storage device for buffering — S4042

FIG. 10

A storage device
receives packets:
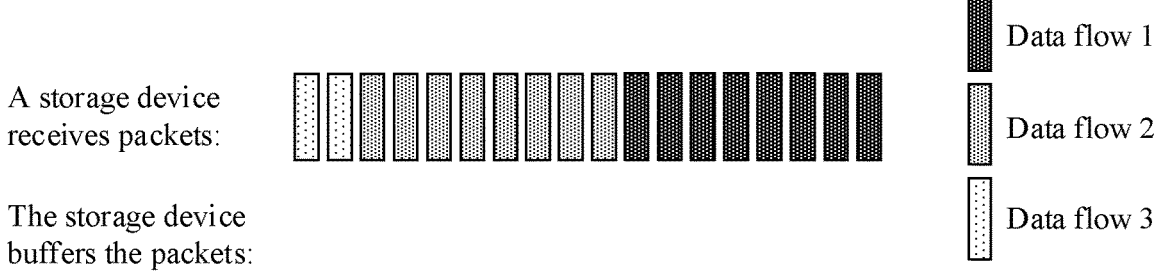
Data flow 1
Data flow 2
Data flow 3
The storage device
buffers the packets:
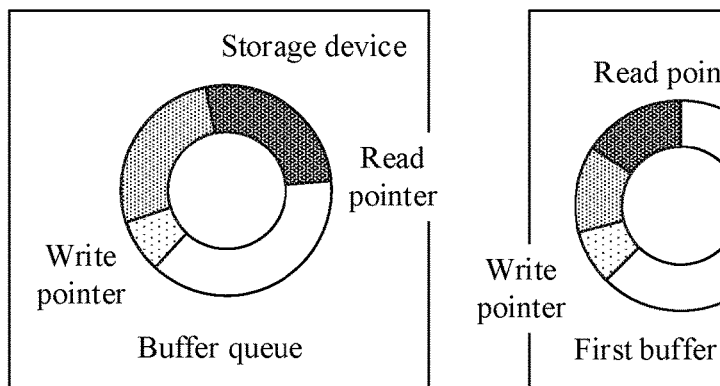
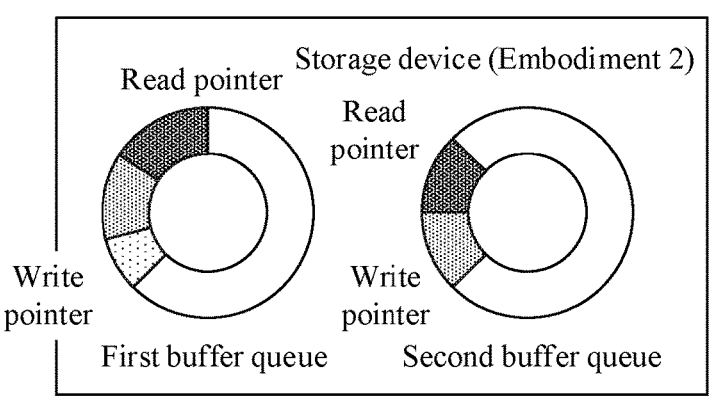
Sequence 3
Sequence 4
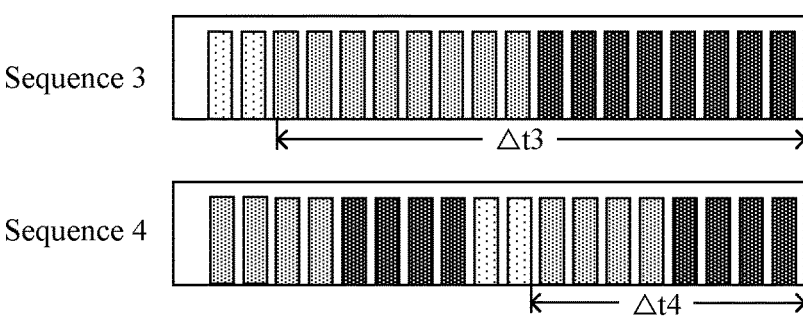
FIG. 19

DATA FORWARDING METHOD, DATA BUFFERING METHOD, APPARATUS, AND RELATED DEVICE

CROSS-REFERENCE TO RELATED APPLICATIONS

This application is a continuation of International Patent Application No. PCT/CN2020/115582 filed on Sep. 16, 2020, which claims priority to Chinese Patent Application No. 201911249818.6 filed on Dec. 9, 2019. The disclosures of the aforementioned applications are hereby incorporated by reference in their entireties.

TECHNICAL FIELD

This disclosure relates to the field of network communications technologies, and in particular, to a data forwarding method, a data buffering method, an apparatus, and a related device.

BACKGROUND

When a sender in a network sends a packet to a receiver, the packet passes through a plurality of forwarding devices on a path between the sender and the receiver. When a plurality of senders sends packets to a same receiver, these packets may be aggregated into a same egress queue of a same forwarding device. If an ingress rate of the egress queue is greater than an egress rate, the egress queue is congested or even fully filled. Therefore, a packet that subsequently arrives at the forwarding device cannot be sent to the egress queue, and the packet is dropped. As a result, packet drop occurs on the network, and forwarding performance of the forwarding device is severely degraded.

When egress queues are congested or even fully filled, some forwarding devices temporarily buffer received packets by using buffer queues other than the egress queues. After the congested state of the egress queues is cancelled or relieved, the forwarding devices extract the temporarily buffered packets from the buffer queues, and then send the packets to the egress queues, to reduce packet loss. However, in actual application, packets from different senders belong to different data flows or traffic flows. Different data flows include different quantities of packets and have different flowsizes. For a small data flow, because time consumed for transmitting the small data flow on a forwarding path is short, a longer period of time in which the small data flow waits in the egress queue and the buffer queue of the forwarding device causes greater impact on transmission performance of the forwarding device. In addition, in the process in which the forwarding device schedules the packet from the buffer queue to the egress queue, if a new data flow that has not occurred before arrives at the forwarding device, the forwarding device also sends packets in the new data flow to the buffer queue for buffering. Therefore, forwarding of the new data flow is affected, congestion spreads, and forwarding performance of the device deteriorates.

SUMMARY

This disclosure provides a data forwarding method, a data buffering method, an apparatus, and a related device, to improve forwarding performance of a forwarding device.

According to a first aspect, this disclosure provides a data forwarding method. The method includes that after congestion of an egress queue is relieved, a network device receives a packet sent by an upstream node, the network device obtains a flowkey of the packet, where the flowkey indicates a data flow to which the packet belongs, the network device determines, based on the flowkey, whether a previous packet belonging to the data flow is buffered in a storage device associated with the egress queue, and when the storage device does not buffer the previous packet of the data flow, the network device schedules the packet to the egress queue, to forward the packet to a downstream node, where the storage device is configured to buffer a packet that is received by the network device during congestion of the egress queue of the network device.

According to the foregoing method, after congestion of the egress queue is relieved, if the network device receives the packet sent by the upstream device, the network device determines whether the storage device buffers the previous packet that belongs to the same data flow as the packet. If the storage device does not buffer the previous packet, the network device may determine that the packet belongs to a new data flow. In this case, to avoid affecting forwarding performance of the new data flow, the network device directly schedules the packet to the egress queue, to implement queue jumping. Therefore, in the solution in this embodiment of this disclosure, when congestion of the egress queue of the network device is relieved, time consumed from the arrival of the packet of the new data flow at the network device to the forwarding of the packet to the downstream node can be reduced, and forwarding performance of the network device can be improved.

In an implementation, the method further includes, when the previous packet of the data flow is buffered in the storage device, the network device sends the packet to the storage device for buffering. Therefore, if the storage device buffers the previous packet, the network device may determine that the packet belongs to a data flow that has been buffered in the storage device. Therefore, to prevent packet disorder in the data flow, the network device sends the packet to the storage device for buffering.

In an implementation, the method further includes that the network device sends the received packet to the storage device for buffering during congestion of the egress queue of the network device. In this way, packet drop caused by congestion or full occupation of the egress queue is avoided.

In an implementation, the method further includes that the network device records a quantity of packets of each data flow that are buffered in the storage device. Therefore, after congestion of the egress queue is relieved, the network device determines, based on the recorded packet quantity, whether the network device continues to send a newly received packet to the storage device for buffering. In an implementation, the network device records, in a flow table, the quantity of packets of each data flow that are buffered in the storage device, where the flow table includes at least one entry, and each entry includes one flowkey and a packet quantity corresponding to the flowkey. Therefore, the network device may obtain, by querying the flow table, the quantity of packets of each data flow that are buffered in the storage device.

In an implementation, the network device queries the flow table based on the flowkey, to obtain a packet quantity corresponding to the data flow in the flow table, and when the packet quantity is equal to 0, the network device determines that the storage device currently does not buffer the previous packet of the data flow, or when the packet quantity is greater than 0, the network device determines that the storage device currently buffers the previous packet of the data flow.

According to a second aspect, this disclosure further provides a data buffering method. The method includes that a storage device receives a packet, where the packet is sent by a network device during congestion of an egress queue of the network device, and the storage device includes a first buffer and a second buffer, the storage device obtains a flowkey of the packet, where the flowkey indicates a data flow to which the packet belongs, the storage device obtains a flowsize of all received packets that belong to the data flow, when the flowsize is less than or equal to a preset threshold, the storage device buffers the packet in the first buffer, and after congestion is relieved, the storage device sends the packet in the first buffer to the network device.

Based on the foregoing method, during sending congestion of the egress queue of the network device, the storage device determines whether the packet received from the network device belongs to a large flow or a small flow. If the packet belongs to the small flow, the storage device buffers the packet in the first buffer. If the packet belongs to the large flow, the storage device buffers the packet in the second buffer. After congestion of the egress queue of the network device is relieved, the storage device sends the packet to the egress queue from the first buffer. Therefore, according to the solution in this embodiment of this disclosure, when congestion of the egress queue of the network device is relieved, time in which the packet of the small flow waits in the egress queue can be reduced, efficiency of forwarding the small flow by the network device can be improved, and device performance can be improved.

In an implementation, the method further includes, when the flowsize is greater than the preset threshold, the storage device buffers the packet in the second buffer. Therefore, when the flowsize is greater than the threshold, the storage device determines that the data flow to which the packet belongs is the large flow, and buffers the packet in the second buffer.

In an implementation, the method further includes that the storage device records a flowsize of packets that belong to each data flow and that are received from the network device. Therefore, the storage device may determine, based on the recorded flowsizes, whether the received packet belongs to the large flow or the small flow.

In an implementation, the storage device records, in a flow table, the flowsize of the packets that belong to each data flow and that are received from the network device, where the flow table includes at least one entry, and each entry includes one flowkey and a packet flowsize corresponding to the flowkey. Therefore, the storage device may obtain, by querying the flow table, the flowsize of the packets of each data flow that are buffered in the storage device.

In an implementation, the storage device updates the flow table before buffering the packet. Therefore, each time the storage device receives a packet, the storage device updates the flow table based on a size of the received packet, to implement real-time update of the flow table.

According to a third aspect, this disclosure further provides a data forwarding apparatus. The data forwarding apparatus has a function of implementing an action of the foregoing network device. The function may be implemented by hardware, or may be implemented by hardware executing corresponding software. The hardware or software includes one or more units or modules corresponding to the foregoing function. In a possible design, the data forwarding apparatus includes a receiving unit, a processing unit, and a sending unit. The receiving unit is configured to receive a packet sent by an upstream node after congestion of an egress queue is relieved. The processing unit is configured to obtain a flowkey of the packet, where the flowkey indicates a data flow to which the packet belongs. The processing unit is further configured to determine, based on the flowkey, whether a previous packet belonging to the data flow is buffered in a storage device associated with the egress queue. The sending unit is configured to schedule the packet to the egress queue when the storage device does not buffer the previous packet of the data flow, to forward the packet to a downstream node. The storage device is configured to buffer a packet that is received by the network device during congestion of the egress queue of the network device.

Based on the foregoing apparatus, after congestion of the egress queue is relieved, if the network device receives the packet sent by an upstream device, the network device determines whether the storage device buffers the previous packet that belongs to the same data flow as the packet. If the storage device does not buffer the previous packet, the network device may determine that the packet belongs to a new data flow. In this case, to avoid affecting forwarding performance of the new data flow, the network device directly schedules the packet to the egress queue, to implement queue jumping. Therefore, in the solution in this embodiment of this disclosure, when congestion of the egress queue of the network device is relieved, time consumed from the arrival of the packet of the new data flow at the network device to the forwarding of the packet to the downstream node can be reduced, and forwarding performance of the network device can be improved.

According to a fourth aspect, this disclosure further provides a data buffering apparatus. The data buffering apparatus has a function of implementing an action of the foregoing storage device. The function may be implemented by hardware, or may be implemented by hardware executing corresponding software. The hardware or software includes one or more units or modules corresponding to the foregoing function. In a possible design, the data buffering apparatus includes a storage unit, a receiving unit, a processing unit, and a sending unit. The storage unit includes a first buffer and a second buffer. The receiving unit is configured to receive a packet, where the packet is sent by a network device during congestion of an egress queue of the network device. The processing unit is configured to obtain a flowkey of the packet, where the flowkey indicates a data flow to which the packet belongs. The processing unit is further configured to obtain a flowsize of all packets that are received by the apparatus and that belong to the data flow. The processing unit is further configured to buffer the packet in the first buffer when the flowsize is less than or equal to a preset threshold. The sending unit is configured to send the packet in the first buffer to the network device after congestion is relieved.

Based on the foregoing apparatus, during sending congestion of the egress queue of the network device, the storage device determines whether a packet received from the network device belongs to a large flow or a small flow. If the packet belongs to the small flow, the storage device buffers the packet in the first buffer. If the packet belongs to the large flow, the storage device buffers the packet in the second buffer. After congestion of the egress queue of the network device is relieved, the storage device sends the packet to the egress queue from the first buffer. Therefore, according to the solution in this embodiment of this disclosure, when congestion of the egress queue of the network device is relieved, time in which the packet of the small flow waits in the egress queue can be reduced, efficiency of forwarding the small flow by the network device can be improved, and device performance can be improved.

According to a fifth aspect, this disclosure further provides a network device. The network device includes a memory and a processor, where the memory is coupled to the processor, and the memory is configured to store computer program code. The computer program code includes computer instructions, and when the processor executes the computer instructions, the network device is enabled to perform the method according to the first aspect and the implementations of the first aspect.

According to a sixth aspect, this disclosure further provides a storage device. The storage device includes a memory and a processor, where the memory is coupled to the processor, and the memory is configured to store computer program code. The computer program code includes computer instructions, and when the processor executes the computer instructions, the storage device is enabled to perform the method according to the second aspect and the implementations of the second aspect.

According to a seventh aspect, this disclosure further provides a computer storage medium. The computer storage medium stores computer instructions. When the computer instructions are run on a network device, the network device is enabled to perform the method according to the first aspect and the implementations of the first aspect.

According to an eighth aspect, this disclosure further provides a computer storage medium. The computer storage medium stores computer instructions. When the computer instructions are run on a storage device, the storage device is enabled to perform the method according to the second aspect and the implementations of the second aspect.

According to a ninth aspect, this disclosure further provides a computer program product including instructions. When the computer program product is run on a computer, the computer is enabled to perform the methods according to the foregoing aspects and the implementations of the foregoing aspects.

According to a tenth aspect, this disclosure further provides a chip system. The chip system includes a processor configured to support the foregoing apparatus or device in implementing a function in the foregoing aspects and the implementations of the foregoing aspects, for example, generating or processing information in the foregoing methods.

BRIEF DESCRIPTION OF DRAWINGS

FIG. 10 is a schematic diagram of a data forwarding method according to an embodiment of this disclosure;

FIG. 19 is a schematic diagram of a technical effect of Embodiment 2 of this disclosure;

DESCRIPTION OF EMBODIMENTS

In the following, an application scenario of embodiments of this disclosure is first described with reference to the accompanying drawings.

Figure 1:
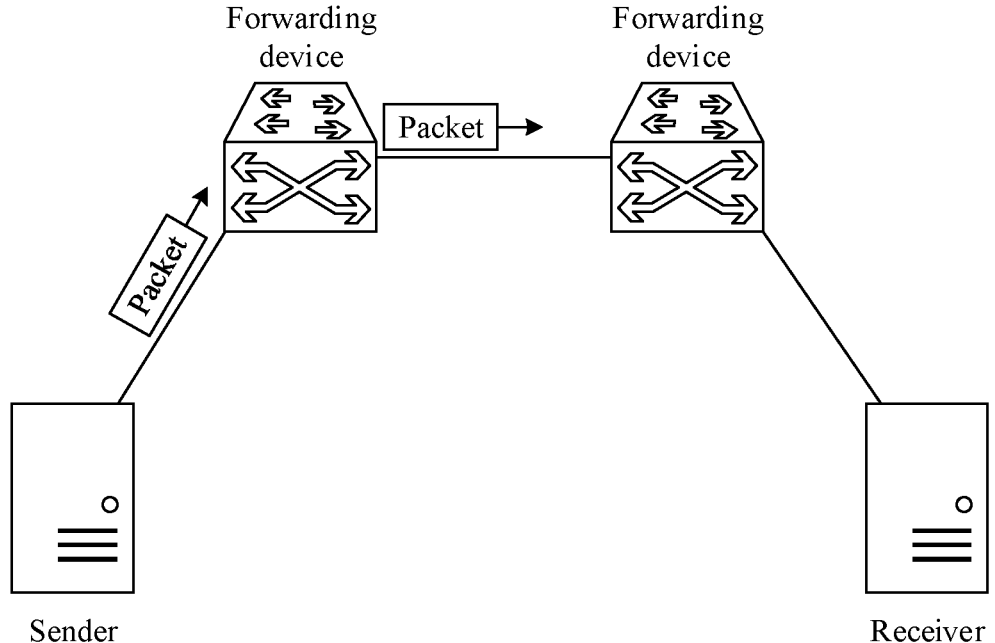
FIG. 1 is a schematic diagram of a packet transmission scenario in which forwarding devices are included according to an embodiment of this disclosure.

FIG. 1 is a schematic diagram of a packet transmission scenario in which forwarding devices are included according to an embodiment of this disclosure. As shown in FIG. 1, when a sender in a network sends a packet to a receiver, the packet passes through a plurality of network devices on a forwarding path between the sender and the receiver, where each network device is configured to receive a packet from an upstream node (that is, a previous-hop node of the packet) on the forwarding path, and forward the packet to a downstream node (that is, a next-hop node of the packet) on the forwarding path. Therefore, from a perspective of function, the network device on the forwarding path between the sender and the receiver may also be referred to as a forwarding device.

Figure 2:
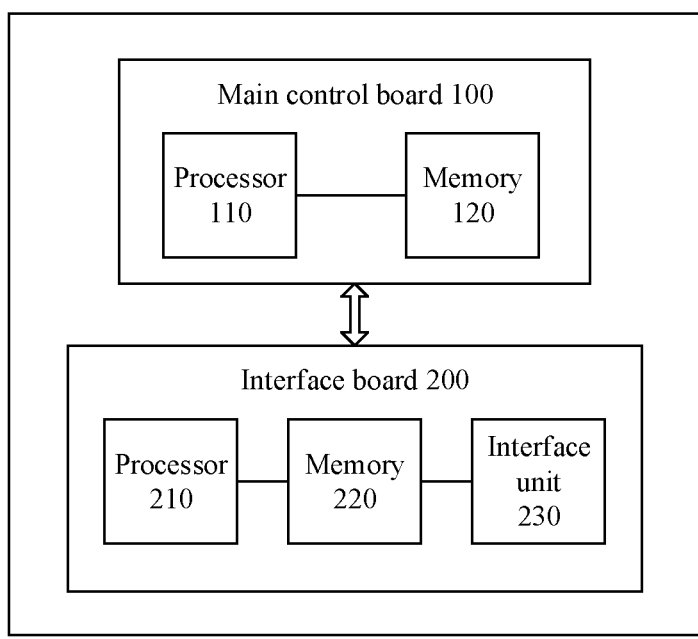
FIG. 2 is a schematic diagram of a structure of a network device according to an embodiment of this disclosure.

FIG. 2 is a schematic diagram of a structure of a network device according to an embodiment of this disclosure. The network device may be a router, a switch, a network host, a server, or the like, and may be used as a forwarding device to forward a packet between an upstream node and a downstream node. As shown in FIG. 2, the network device may include at least one processor, at least one memory, and at least one interface unit. For example, the network device may further include a main control board 100 and an interface board 200. The main control board 100 may include a processor 110 and a memory 120, and the processor 110 is coupled to the memory 120. The memory 120 stores program instructions, and the processor 110 may invoke the program instructions in the memory 120, so that the network device performs a related method, for example, parsing a packet or generating a packet. The interface board 200 may include a processor 210, a memory 220, and an interface unit 230. The processor 210, the memory 220, and the interface unit 230 are coupled. The memory 220 stores program instructions, and the processor 210 may invoke the program instructions in the memory 220, so that the network device performs a related method, for example, receiving and forwarding a packet by using the interface unit 230. In this embodiment of this disclosure, the interface unit 230 is configured to establish a communication link to another network device, to implement packet receiving and sending. For example, the interface unit 230 may include one or more fiber link interfaces, Ethernet interfaces, microwave link interfaces, or copper line interfaces. The main control board 100 and the interface board 200 may establish a connection by using a bus, to implement data exchange.

Figure 3:
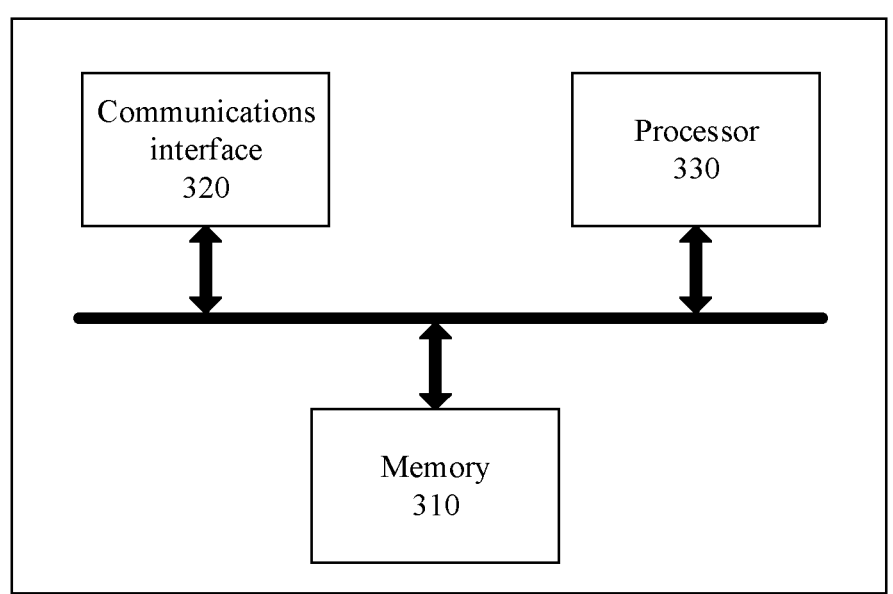
FIG. 3 is a schematic diagram of a structure of another network device according to an embodiment of this disclosure.

FIG. 3 is a schematic diagram of a structure of another network device according to an embodiment of this disclosure. The network device may be a router, a switch, a network host, a server, or the like, and may be used as a forwarding device to forward a packet between a source node and a destination node. As shown in FIG. 3, the network device may include a memory 310, a communications interface 320, and a processor 330. The memory 310, the communications interface 320, and the processor 330 are coupled. The memory 310 stores program instructions, and the processor 330 may invoke the program instructions in the memory 310, so that the network device performs a related method, for example, parsing a packet, generating a packet, and receiving and forwarding a packet by using the communications interface 320.

In this embodiment of this disclosure, the processor of the network device may include one or more processing units, for example, a system on a chip (SoC), a central processing unit (CPU), a microcontroller (MCU), and a storage controller. Different processing units may be independent components, or may be integrated into one or more processors.

In this embodiment of this disclosure, the memory of the network device may include one or more storage units, for example, may include a volatile memory, such as a dynamic random-access memory (RAM) (DRAM), or a static RAM (SRAM), and may further include a non-volatile memory (NVM), such as a read-only memory (ROM), and a flash memory. Different storage units may be independent components, or may be integrated or packaged into one or more processors or communications interfaces as a part of the processor or the communications interface.

In this embodiment of this disclosure, the communications interface of the network device may include, for example, a network adapter, a network interface card, a local area network (LAN) adapter, a network interface controller (NIC), and a modem. The communications interface may be an independent component, or may be partially or completely integrated or packaged in the processor as a part of the processor.

It may be understood that the structure shown in this embodiment of this disclosure does not constitute a specific limitation on the network device. In some other embodiments of this disclosure, the network device may include more or fewer components than those shown in the figure, or some components may be combined, or some components may be split, or there may be a different component arrangement. The components shown in the figure may be implemented by using hardware, software, or a combination of software and hardware.

Figure 4:
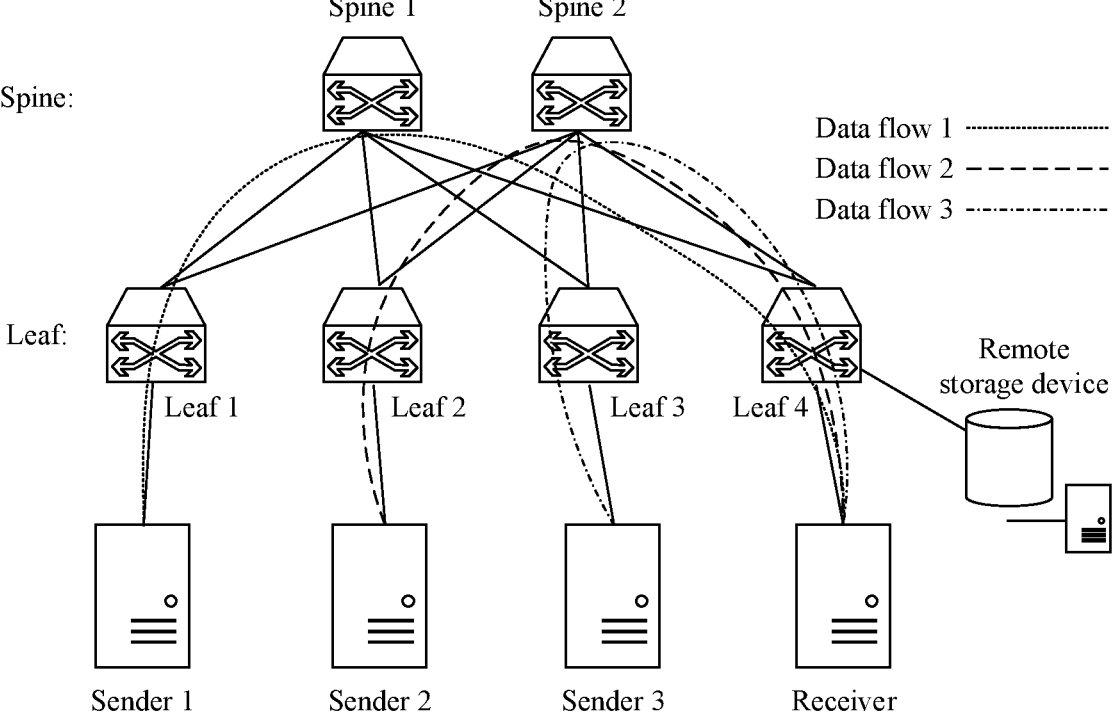
FIG. 4 is a schematic diagram of an architecture of a network system in which forwarding devices are included according to an embodiment of this disclosure.

FIG. 4 is a schematic diagram of an architecture of a network system in which forwarding devices are included according to an embodiment of this disclosure. For example, the network architecture may be applied to a data center (DC), to deploy a high-performance computing (HPC) cluster, a distributed storage system (DSS), a distributed machine learning system, other distributed service systems, and the like. As shown in FIG. 4, the network system has system architectures at two levels, including at least one high-level forwarding device (for example, a spine switch) and a plurality of low-level forwarding devices (for example, leaf switches). Each low-level forwarding device is connected to all the high-level forwarding devices. The low-level forwarding device is configured to connect to a server, a network host, or another network device. The high-level forwarding device is a backbone device of the network system, and is configured to connect all the low-level forwarding devices.

In the structure shown in FIG. 4, any server, network host, or network device may send a packet to another server, network host, or another network device by using the forwarding device. A party that sends a packet may be referred to as a source node or a sender. A party that receives the packet may be referred to as a destination node or a receiver. If the sender continuously sends a plurality of packets to the receiver, it may be considered that the sender sends a data flow (or a traffic flow) to the receiver. When a plurality of senders sends data flows to a same receiver, these data flows may be aggregated to a same forwarding device for forwarding. Therefore, the forwarding device forwards the plurality of data flows to a same downstream node in a same time period. For example, a data flow 1 sent by a sender 1 to a receiver may be forwarded to the receiver through a leaf 1, a spine 1, and a leaf 4, a data flow 2 sent by a sender 2 to the receiver may be forwarded to the receiver through a leaf 2, a spine 2, and the leaf 4, and a data flow 3 sent by a sender 3 to the receiver may be forwarded to the receiver through a leaf 3, the spine 2, and the leaf 4. When the data flow 1, the data flow 2, and the data flow 3 are sent in a same time period, these data flows arrive at the leaf 4 in a same time period. Therefore, the leaf 4 forwards the data flow 1, the data flow 2, and the data flow 3 to the receiver in a same time period.

Figure 5:
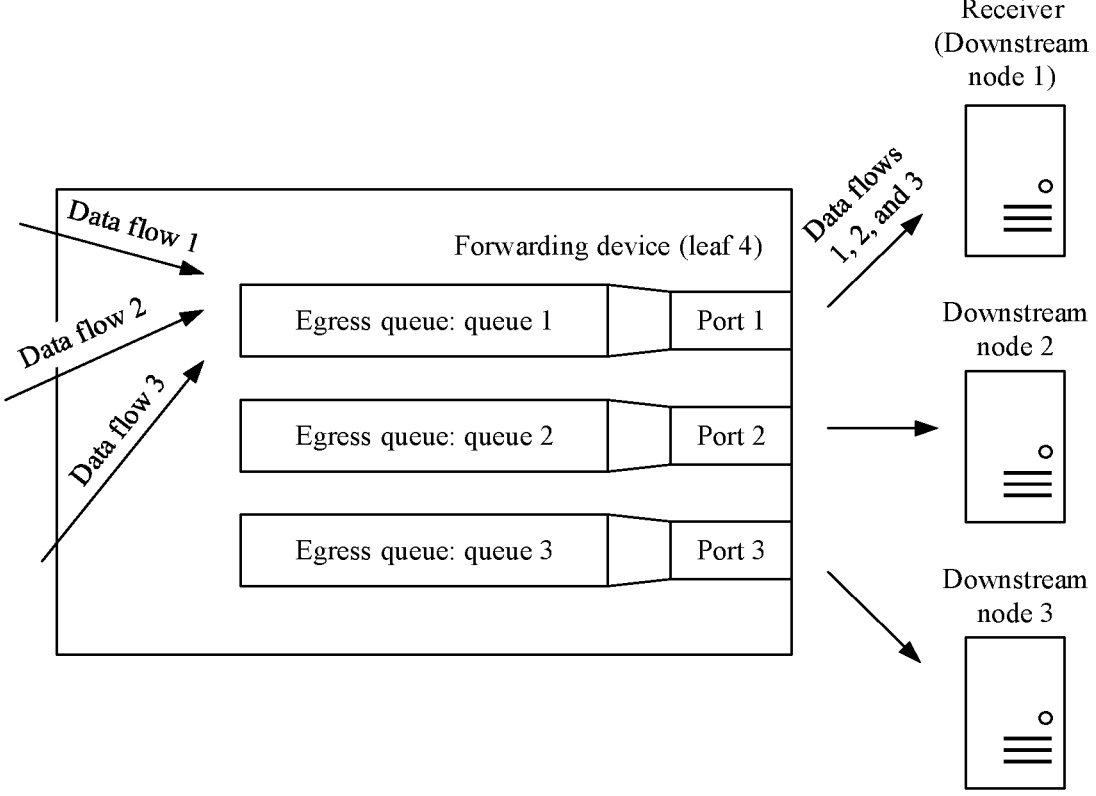
FIG. 5 is a schematic diagram of forwarding data flows to downstream nodes by a forwarding device according to an embodiment of this disclosure.

FIG. 5 is a schematic diagram of forwarding data flows to downstream nodes by the forwarding device according to an embodiment of this disclosure. As shown in FIG. 5, usually, the forwarding device may allocate a corresponding downstream port to each downstream node, and allocate an egress queue to each downstream port. The egress queue may be implemented in any memory in FIG. 2 or FIG. 3. The egress queue is used to buffer packets to be sent to the downstream nodes, dequeue the packets according to a first in first out (FIFO) principle, and forward the packets to the downstream nodes. For example, as shown in FIG. 5, if the leaf 4 allocates a downstream port port 1 to the receiver, and allocates an egress queue queue 1 to the downstream port port 1, packets that are received by the leaf 4 and that belong to the data flow 1, the data flow 2, and the data flow 3 are first buffered into the egress queue queue 1. Then, the packets are dequeued in sequence according to the first in first out principle and forwarded to the receiver. Therefore, the egress queue queue 1 simultaneously includes the packets that belong to the plurality of data flows.

It should be additionally noted that the downstream port of the forwarding device may be a physical port or a virtual port. The physical port may correspond to, for example, a fiber link interface, an Ethernet interface, a microwave link interface, or a copper line interface of the forwarding device. Each interface is a port. A virtual port is a network port obtained through logical division, for example, a Transmission Control Protocol (TCP)/Internet Protocol (IP) port. The virtual port serves as an endpoint in communication between forwarding devices. Each port has a port number, and is associated with IP addresses and communications protocols of the forwarding devices.

For an egress queue, packet traffic (for example, a quantity of bytes) sent to the egress queue in unit time may be referred to as an ingress rate Cin of the egress queue, and packet traffic dequeued in unit time may be referred to as an egress rate Cout of the egress queue. Affected by factors such as hardware performance, load, and port rate limit configuration of the forwarding device, the egress rate of the egress queue has an upper limit, and the upper limit may be referred to as a maximum egress rate of the egress queue. The ingress rate of the egress queue is related to packet traffic that is received by the forwarding device in unit time and to be forwarded by a downstream port corresponding to the egress queue. For example, for the leaf 4, larger packet traffic that is received in unit time and that is of the data flow 1, the data flow 2, and the data flow 3 indicates larger packet traffic to be sent to the egress queue queue 1 in unit time and a higher ingress rate of the egress queue queue 1. Smaller packet traffic that is received by the leaf 4 in unit time and that is of the data flow 1, the data flow 2, and the data flow 3 indicates smaller packet traffic to be sent to the egress queue queue 1 in unit time and a lower ingress rate of the egress queue queue 1.

Figure 6:
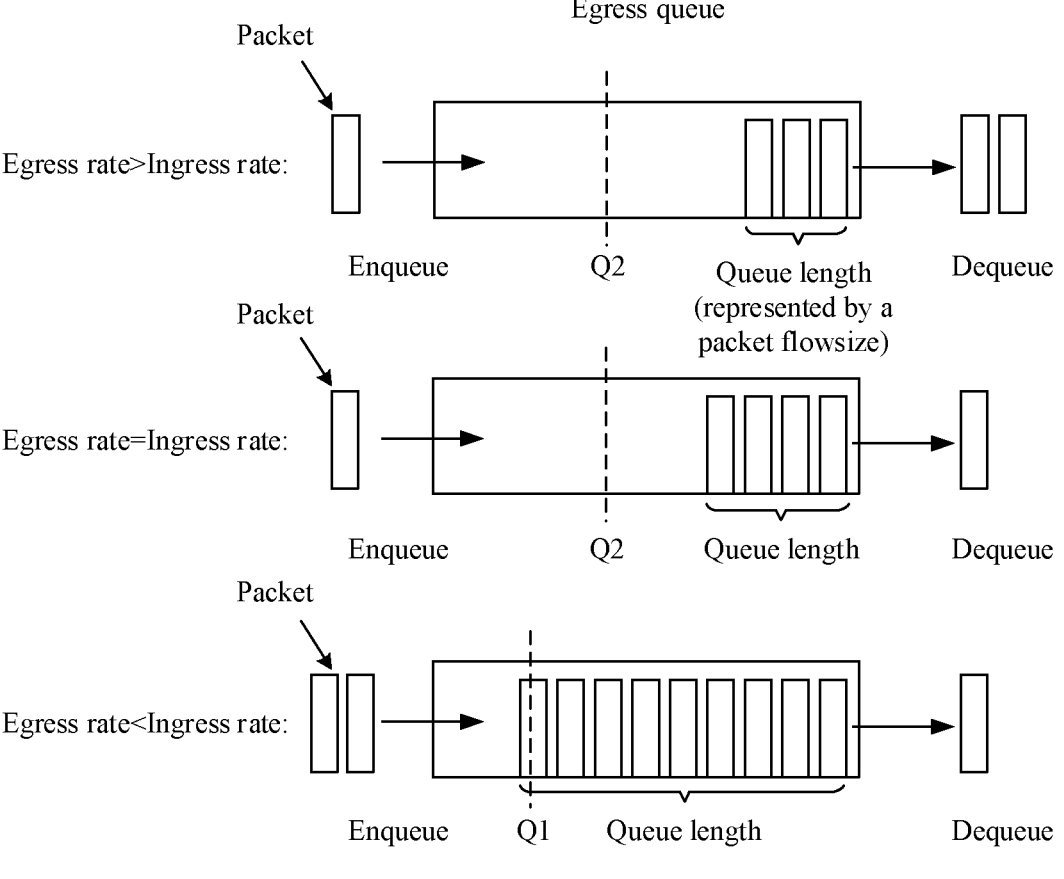
FIG. 6 is a schematic diagram of egress queue states according to an embodiment of this disclosure.

FIG. 6 is a schematic diagram of egress queue states according to an embodiment of this disclosure. As shown in FIG. 6, according to different ingress rates and egress rates of egress queues, the egress queues may have the following several states.

State 1: An egress rate is greater than an ingress rate. In this state, if there are packets in an egress queue, a flowsize of the packets gradually decreases, or even the egress queue becomes empty. If the flowsize of the packets is less than a preset threshold Q2, it may be considered that the egress queue is in an idle state or a non-congested state.

State 2: An egress rate is equal to an ingress rate. In this state, if there are packets in an egress queue, a flowsize of the packets keeps constant. In this case, if the flowsize of the packets is less than the preset threshold Q2, it may be considered that the egress queue is in an idle state or a non-congested state, or if the flowsize of the packets is greater than or equal to a threshold Q1, it may be considered that the egress queue is in a congested state, but the congestion is not further aggravated. The threshold Q1 and the threshold Q2 may be a same value, or may be different values. For example, the threshold Q1 is greater than the threshold Q2.

State 3: An egress rate is less than an ingress rate. In this state, a flowsize of packets in an egress queue gradually increases. When the flowsize of the packets is greater than or equal to the threshold Q1, it may be considered that the egress queue is in a congested state, and as the flowsize of the packets in the egress queue continues to increase, the congestion is further aggravated. Because a capacity of the egress queue is limited, the egress queue may be fully filled.

Therefore, a packet that subsequently arrives at a forwarding device cannot be sent to the egress queue, and the packet is dropped. As a result, packet drop occurs on a network, and forwarding performance of the forwarding device is severely degraded.

When egress queues are congested or even fully filled, some forwarding devices temporarily buffer received packets by using buffer queues other than the egress queues. After the congested state of the egress queues is cancelled or relieved, the forwarding devices extract the temporarily buffered packets from the buffer queues, and send the packets to the egress queues to send the packets to downstream nodes, so as to relieve congestion and reduce packet drop. The "buffer queue" may be storage space of another memory other than the egress queue in the forwarding device, or may be storage space in a remote storage device other than the forwarding device shown in FIG. 4. The forwarding device may establish a connection to the remote storage device by using a communication link.

In this embodiment of this disclosure, the remote storage device may be a device such as a server, a computer host, or a network attached storage (NAS) that establishes a communication connection to the forwarding device. One or more memories configured to buffer packets may be disposed in the remote storage device. The memory may include a volatile memory or an NVM. To improve storage performance of the remote storage device and reduce storage and read latency, the memory may be a solid-state drive (SSD) based on the NVM Express (NVMe), a double data rate (DDR) synchronous DRAM (SDRAM), or the like.

A solution in which the forwarding device temporarily buffers a packet by using the remote storage device may be implemented by using the Remote Direct Memory Access (RDMA) protocol. RDMA is a technology in which data in the memory of the remote storage device is accessed without using an operating system kernel of the remote storage device, and supports zero-copy network transmission, so that the forwarding device and the remote storage device directly transmit data between application program memories without copying the data between an application program memory and an operating system buffer. Therefore, low network communication latency can be achieved, and this technology is widely used in massive parallel computer clusters.

The following uses the RDMA protocol as an example to describe a method in which the forwarding device temporarily buffers a packet by using the remote storage device during congestion in the egress queue, obtains the packet from the remote storage device after the congestion is relieved, and schedules the packet to the egress queue.

Figure 7:
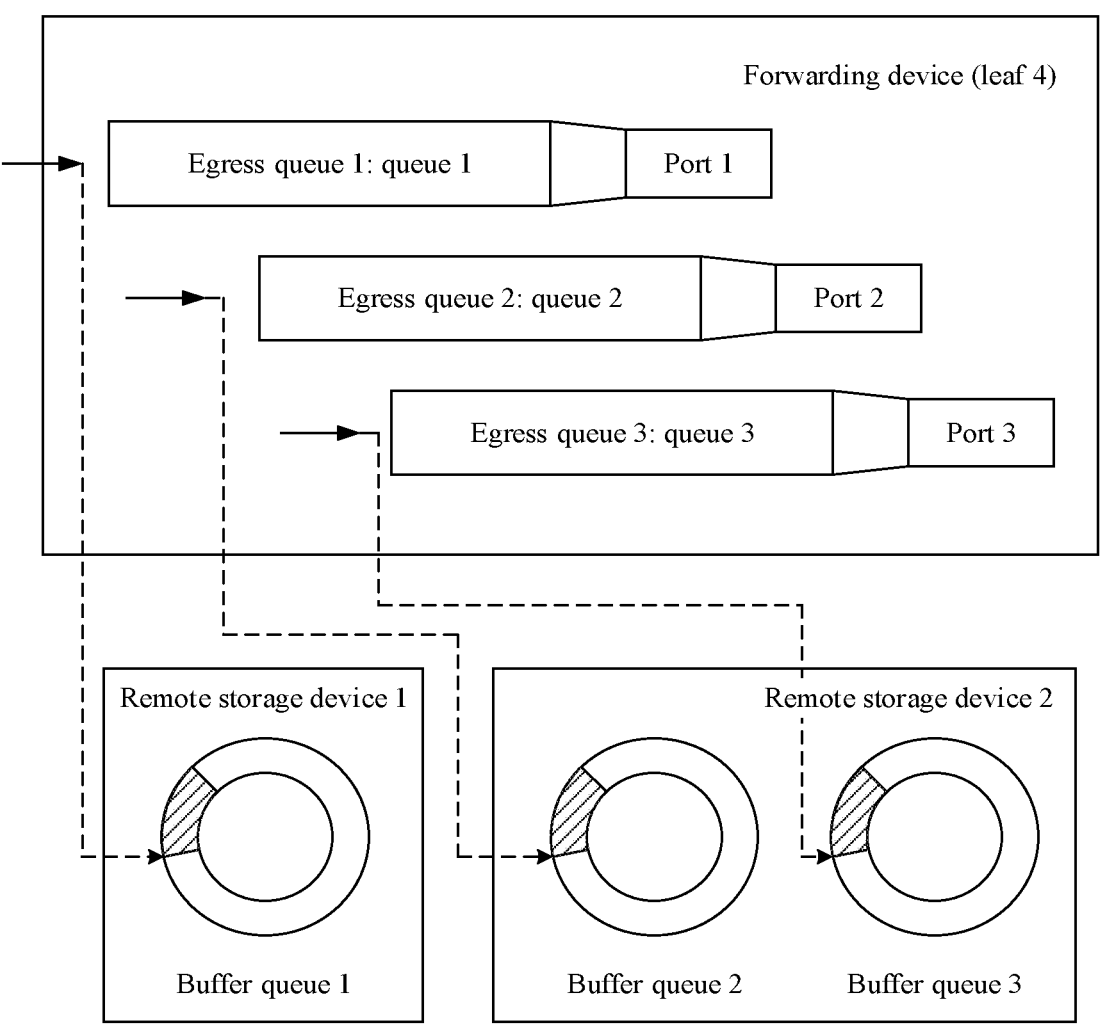
FIG. 7 is a schematic diagram of temporarily buffering a packet by a forwarding device by using a remote storage device according to an embodiment of this disclosure.

FIG. 7 is a schematic diagram of temporarily buffering a packet by a forwarding device by using a storage device according to an embodiment of this disclosure. As shown in FIG. 7, the forwarding device may register a buffer queue in a memory of the storage device. The buffer queue may be, for example, a ring buffer queue established according to a "first in first out" principle. The storage device may include a plurality of buffer queues. Each buffer queue is associated with one egress queue of the forwarding device. When packet congestion occurs in the egress queue, the buffer queue is used to buffer a packet to enter the egress queue. It should be noted that, as shown in FIG. 7, the plurality of buffer queues may be located in one storage device, or may be located in different storage devices. For example, when the forwarding device includes an egress queue 1, an egress queue 2, and an egress queue 3, the forwarding device may register a buffer queue 1, a buffer queue 2, and a buffer queue 3 in the storage device. The buffer queue 1 is associated with the egress queue 1 and is used to buffer a packet to enter the egress queue 1 during congestion of the egress queue 1, the buffer queue 2 is associated with the egress queue 2 and is used to buffer a packet to enter the egress queue 2 during congestion of the egress queue 2, and the buffer queue 3 is associated with the egress queue 3 and is used to buffer a packet to enter the egress queue 3 during congestion of the egress queue 3.

Figure 8:
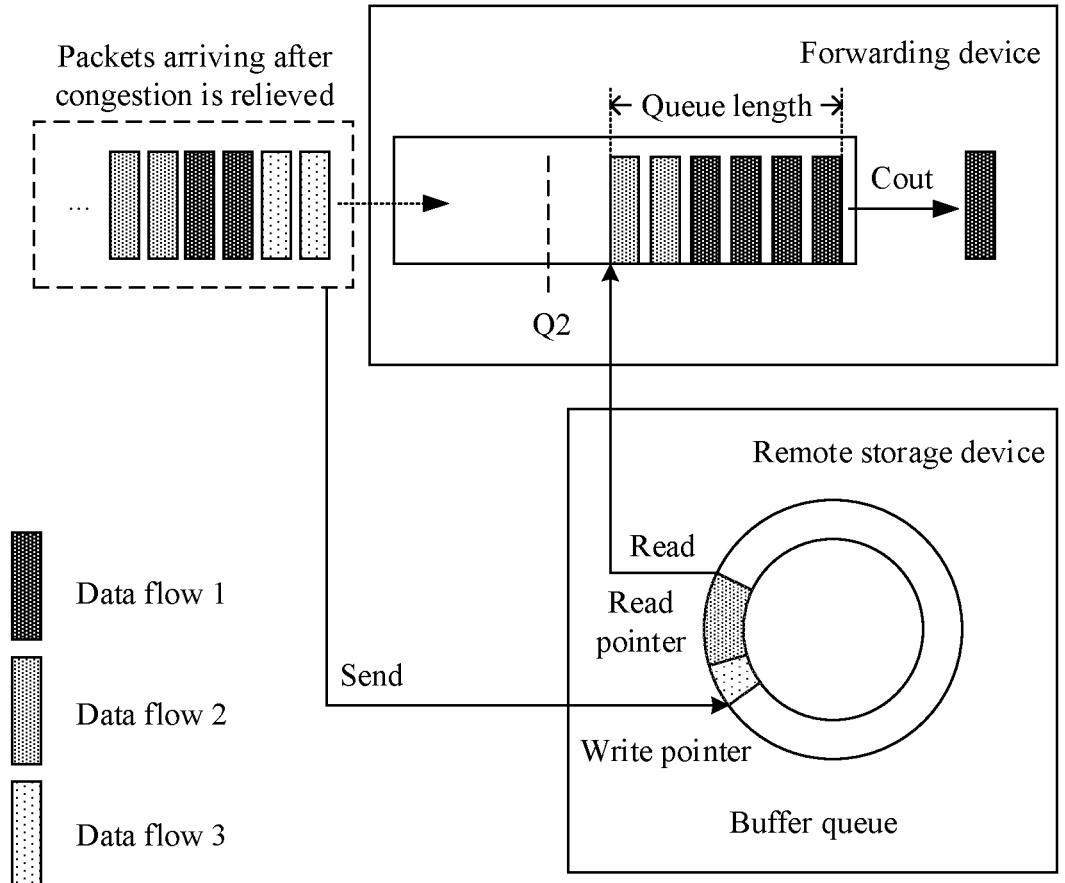
FIG. 8 is a schematic diagram of temporarily buffering a packet by a forwarding device by using a remote storage device according to an embodiment of this disclosure.
Figure 9:
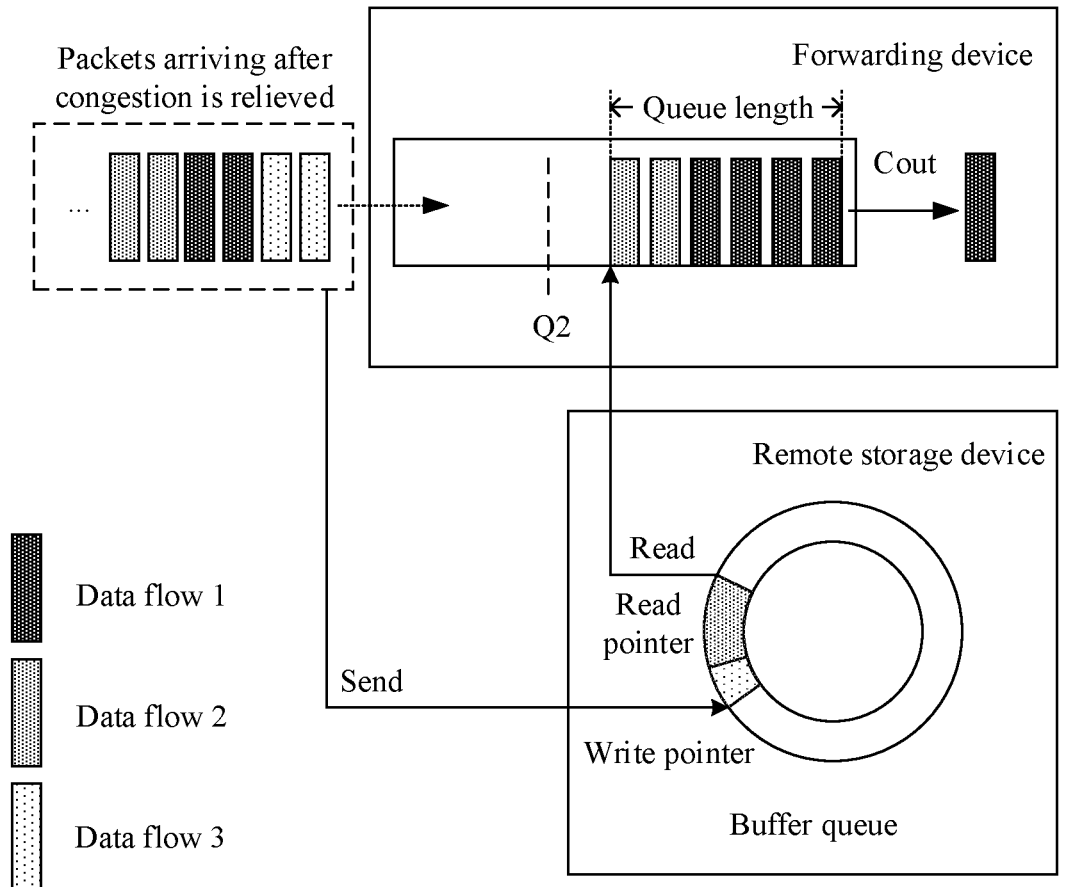
FIG. 9 is a schematic diagram of re-obtaining a packet by a forwarding device from a remote storage device according to an embodiment of this disclosure.

With reference to FIG. 8 and FIG. 9, by using an example in which an egress queue and a buffer queue are associated, the following describes the process in which the forwarding device temporarily buffers a packet by using the storage device, obtains the packet from the storage device, and schedules the packet to the egress queue.

As shown in FIG. 8, a packet buffered in the egress queue is dequeued and forwarded to a downstream node at an egress rate Cout, and the forwarding device schedules a received packet to the egress queue at an ingress rate Cin. It is easy to understand that packets received by the forwarding device may belong to different data flows. When the ingress rate Cin is greater than the egress rate Cout, a flowsize (or a queue length) of packets in the egress queue gradually increases, and reaches the threshold Q1 at a moment T1. In this case, it may be considered that the egress queue enters the congested state at the moment T1. Starting from the moment T1, regardless of a data flow to which the packet received by the forwarding device belongs, the forwarding device encapsulates the packet, and then sends the packet to the buffer queue of the storage device for temporary buffering. Further, as shown in FIG. 8, the buffer queue may be implemented as a ring buffer queue, and memory access is implemented in the ring buffer queue by using a write pointer and a read pointer.

As shown in FIG. 9, when the ingress rate Cin is less than the egress rate Cout, the flowsize of the packets in the egress queue gradually decreases, and reaches the threshold Q2 at a moment T2. In this case, it may be considered that congestion of the egress queue is relieved at the moment T2. The forwarding device starts to read packets from the buffer queue of the storage device according to the "first in first out" principle, and schedules the packets in the buffer queue to the egress queue, so that a flowsize of the packets in the buffer queue gradually decreases until the buffer queue is empty. In addition, to prevent packet disorder, provided that there is a packet in the buffer queue, the forwarding device still sends a received packet to the buffer queue for buffering.

In an application, the technical solutions shown in FIG. 8 and FIG. 9 have the following technical problems.

First, in a process in which the forwarding device schedules a packet from the buffer queue to the egress queue, if a new data flow (for example, a data flow 3 in FIG. 9) arrives at the forwarding device, the forwarding device also sends packets that are in the new data flow to the buffer queue for buffering. In addition, according to the first in first out principle of the buffer queue, the packets of the new data flow can be scheduled to the egress queue for forwarding only after all packets previously buffered in the buffer queue are scheduled to the egress queue. This increases time consumed by the forwarding device to forward the packets of the new data flow, and degrades the forwarding performance of the device. The "new data flow" is a data flow that has not been buffered in the buffer queue before, or a data flow that was buffered in the buffer queue but is not buffered at a current moment.

Second, when the buffer queue includes packets of a plurality of data flows, according to the first in first out principle, a data flow at the tail of the queue (for example, a data flow 2 in FIG. 8) is scheduled to the egress queue after a data flow at the head of the queue (for example, a data flow 1 in FIG. 8) is scheduled. When the "data flow at the head of the queue" includes a large quantity of packets, it takes a long period of time to schedule the data flow at the head of the queue to the egress queue. Therefore, the "data flow at the tail of the queue" waits for a long period of time in the buffer queue. Consequently, time consumed for forwarding the "data flow at the tail of the queue" by the forwarding device increases, and the forwarding performance of the device is degraded. Especially when the "data flow at the tail of the queue" includes only a small quantity of packets, the forwarding performance of the device is degraded more obviously.

Embodiments of this disclosure provide a data forwarding method, a data buffering method, apparatuses corresponding to the methods, a network device, and a storage device, to resolve the technical problems existing in the foregoing technical solutions.

Embodiment 1

Embodiment 1 of this disclosure provides a data forwarding method, applied to a network device. The network device may be any forwarding device configured to forward a packet in FIG. 1 to FIG. 9, for example, a switch, a server, or a network host. Before the method in embodiments of this disclosure is described, related noun concepts in embodiments of this disclosure are first explained. Embodiments of this disclosure includes noun concepts such as "upstream node", "downstream node", "packet", and "egress queue".

Upstream node: a previous-hop node of a network device on a forwarding path. The network structure shown in FIG. 4 is used as an example. An upstream node of the leaf 4 may be the spine 1 or the spine 2, and an upstream node of the spine 2 may be the leaf 1, the leaf 2, or the leaf 3.

Downstream node: a next-hop node of a network device on a forwarding path. The network structure shown in FIG. 4 is used as an example. A downstream node of the leaf 4 may be the receiver, and a downstream node of the spine 2 may be the leaf 4.

In addition, the "packet" and the "egress queue" that are mentioned in embodiments of this disclosure correspond. To be specific, the "packet" mentioned in embodiments of this disclosure is a packet to be scheduled to the "egress queue" mentioned in embodiments of this disclosure. For example, when the "egress queue" is the egress queue 1 shown in FIG. 5, the "packet" may be a packet to be scheduled to the egress queue 1 and that belongs to the data flow 1, the data flow 2, the data flow 3, or other data flows.

As shown in FIG. 10, the method includes the following steps.

Step S401: After congestion of an egress queue is relieved, a network device receives a packet sent by an upstream node.

The network device may monitor a flowsize of packets in the egress queue in real time. If the flowsize of the packets is greater than or equal to the threshold Q, it indicates that the egress queue is in a congested state. If the flowsize of the packets is less than the threshold Q2, it indicates that congestion of the egress queue is relieved.

During congestion of the egress queue, the network device sends the packet received from the upstream node to a storage device associated with the egress queue for buffering. After congestion of the egress queue is relieved, if the network device receives the packet sent by the upstream node, the network device first performs step S402.

Step S402: The network device obtains a flowkey of the packet, where the flowkey indicates a data flow to which the packet belongs.

In this embodiment of this disclosure, the flowkey is used to identify the specific data flow to which the packet belongs, and different data flows correspond to different flowkeys. In a specific implementation, the flowkey may be obtained from a packet header. The packet header usually includes 5-tuple information of the packet. A 5-tuple is a collection including five parameters of the packet: a source IP address, a source port, a destination IP address, a destination port, and a transport layer protocol. The source IP address and the source port are an IP address and a port of a sender of the packet, and the destination IP address and the destination port are an IP address and a port of a receiver of the packet. For example, it is assumed that a 5-tuple of a packet is "192.168.1.1 10000 TCP 121.14.88.76 80". It indicates that the packet is sent by a network device whose IP address is 192.168.1.1 through a port 10000 by using the TCP to a port 80 of another network device whose IP address is 121.14.88.76. Based on the foregoing definition of the 5-tuple, if either of a sender and a receiver of a packet is different from that of another packet, 5-tuples of the two packets are definitely different. Therefore, 5-tuples can be used to distinguish between different data flows.

Optionally, the network device may calculate a hash value of the 5-tuple by using a hash function (or a hash algorithm), and use the hash value of the 5-tuple as the flowkey. The hash function that can be used herein includes but is not limited to an MD5 message-digest algorithm (MD5), a secure hash algorithm 1 (SHA-1), a cyclic redundancy check 32 (CRC32), or the like. A specific hash function used to generate the flowkey is not limited in embodiments of this disclosure.

For example, for the foregoing 5-tuple "192.168.1.1 10000 TCP 121.14.88.76 80", if the CRC32 algorithm is used to calculate the hash value, a result 1353400c is obtained, and the flowkey of the packet is 1353400c. It can be learned that, compared with the 5-tuple, a field length of the flowkey represented by the hash value is definitely shorter. Therefore, if the network device records only the hash value of the 5-tuple, storage space occupation can be reduced, and device performance can be improved.

It should be additionally noted that, in some other implementations, the network device may alternatively obtain 4-tuple or 7-tuple information of the packet from the packet header, and calculate a hash value of the 4-tuple or the 7-tuple as the flowkey. The 4-tuple includes a source IP address, a destination IP address, a source port, and a destination port of the packet. The 7-tuple includes a source IP address, a destination IP address, a source port, a destination port, a transport layer protocol, a service type, and an interface index of the packet.

Step S403: The network device determines, based on the flowkey, whether a previous packet belonging to the data flow is buffered in the storage device associated with the egress queue.

In a specific implementation, during congestion of the egress queue of the network device, the network device may count a quantity of packets that are of each data flow and that are sent by the network device to the storage device for buffering.

For example, as shown in Table 1, the network device may record, in a flow table, the quantity of packets of each data flow that are buffered in the storage device, where the flow table includes at least one entry, and each entry includes one flowkey and a packet quantity corresponding to the flowkey.

TABLE 1

| Flowkey | Counter |
|---------|---------|
| key1 | m |
| key2 | n |
| key3 | 0 |
| . . . | . . . |

Figure 11:
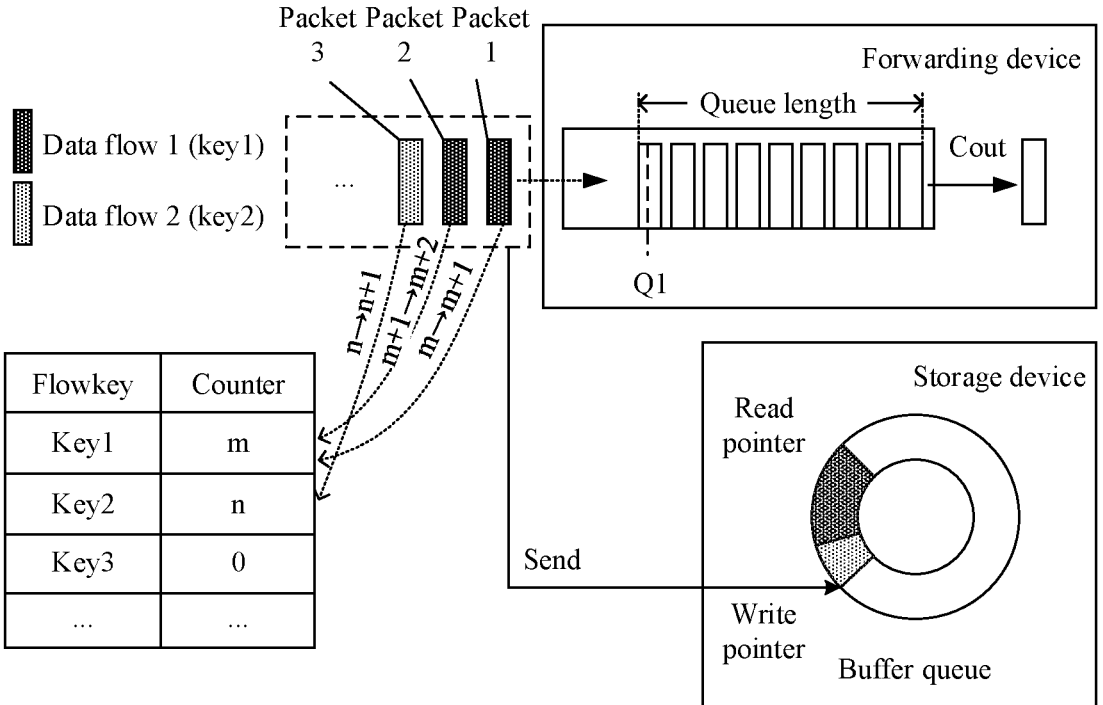
FIG. 11 is a schematic diagram of maintaining a flow table by a network device during congestion of an egress queue according to an embodiment of this disclosure.

With reference to FIG. 11, the following describes an example of a process in which the network device maintains the flow table during congestion of the egress queue of the network device.

As shown in FIG. 11, when a packet 1 arrives at the network device, if a flowkey of the packet 1 obtained through hash calculation performed by the network device on a 5-tuple of the packet 1 is a key1, the network device determines whether the key1 exists in the flow table. If the flow table already includes an entry of the key1, the network device adds 1 to a packet quantity m corresponding to the key1, so that the packet quantity corresponding to the key1 is updated to m+1. If the flow table does not include an entry of the key1, the network device creates the entry of the key1, and adds 1 to a packet quantity that corresponds to the key1 and whose initial value is 0, so that the packet quantity corresponding to the key1 is updated to 1. In addition, the network device sends the packet 1 to the storage device for buffering.

As shown in FIG. 11, when a packet 2 arrives at the network device after the packet 1, if a flowkey of the packet 2 obtained through hash calculation performed by the network device on a 5-tuple of the packet 2 is the key1, the network device adds 1 to the packet quantity m+1 corresponding to the key1 in the flow table, so that the packet quantity corresponding to the key1 is updated to m+2. In addition, the network device sends the packet 2 to the storage device for buffering.

As shown in FIG. 11, when a packet 3 arrives at the network device after the packet 2, if a flowkey of the packet 3 obtained through hash calculation performed by the network device on a 5-tuple of the packet 3 is a key2, the network device determines whether the key2 exists in the flow table. If the flow table already includes an entry of the key2, the network device adds 1 to a packet quantity n corresponding to the key2, so that the packet quantity corresponding to the key2 is updated to n+1. If the flow table does not include an entry of the key2, the network device creates the entry of the key2, and adds 1 to a packet quantity that corresponds to the key2 and whose initial value is 0, so that the packet quantity corresponding to the key2 is updated to 1. In addition, the network device sends the packet 3 to the storage device for buffering.

Figure 12:
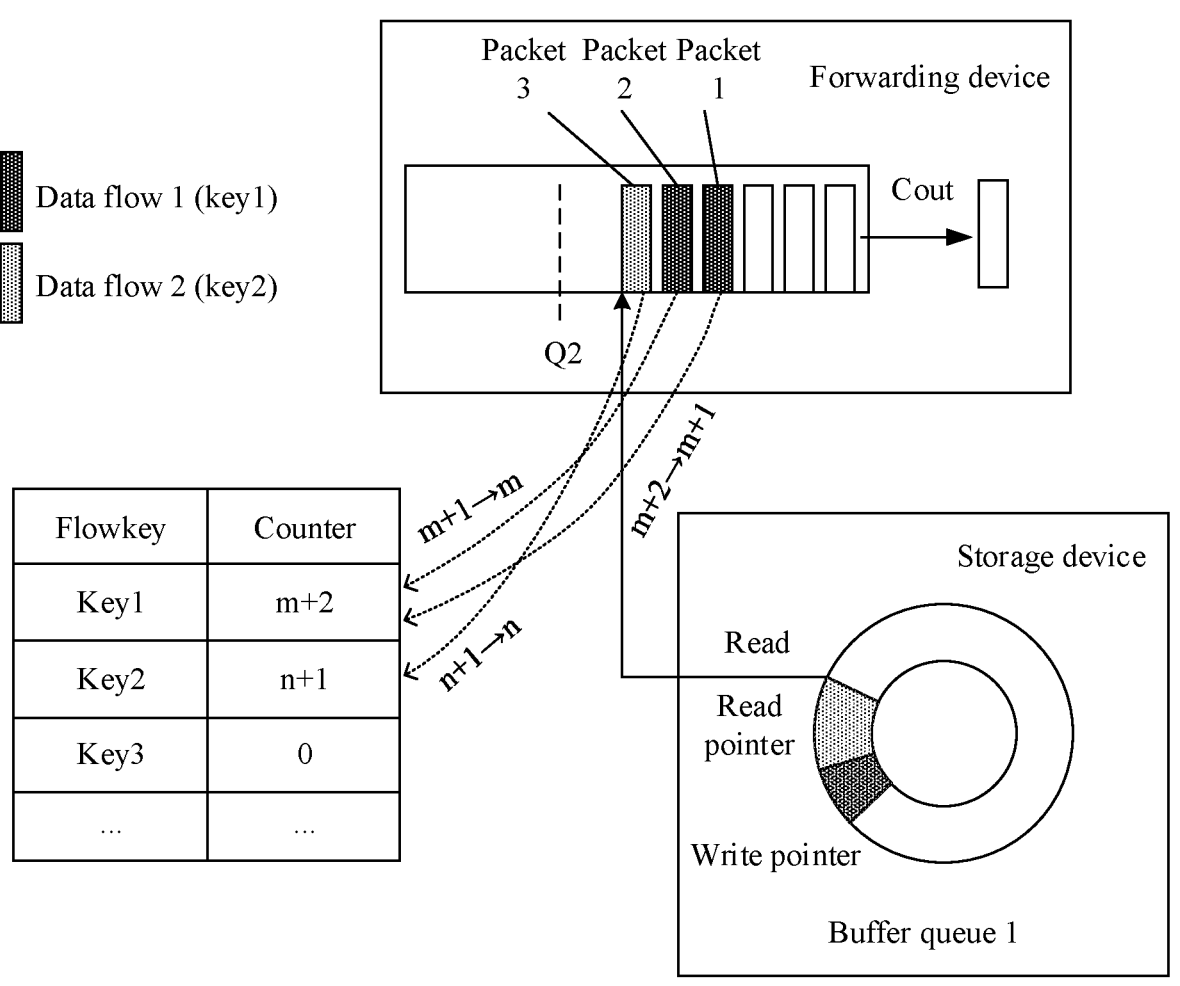
FIG. 12 is a schematic diagram of maintaining a flow table by a network device after congestion of an egress queue is relieved according to an embodiment of this disclosure.

With reference to FIG. 12, the following describes an example of a process in which the network device maintains the flow table after congestion of the egress queue is relieved.

As shown in FIG. 12, the storage device may store packets by using a ring buffer queue established according to the "first in first out" principle. The network device sequentially extracts the packets from the buffer queue according to the "first in first out" principle, and schedules the packets to the egress queue. Each time a packet is extracted, the network device updates a value in the flow table.

For example, the network device first extracts the packet 1 from the buffer queue, and schedules the packet 1 to the egress queue. Because the flowkey of the packet 1 is the key1, the network device subtracts 1 from the packet quantity m+2 corresponding to the key1 in the flow table, so that the packet quantity corresponding to the key1 is updated to m+1. Subsequently, the network device extracts the packet 2 from the buffer queue, and schedules the packet 2 to the egress queue. Because the flowkey of the packet 2 is the key1, the network device subtracts 1 from the packet quantity m+1 corresponding to the key1 in the flow table, so that the packet quantity corresponding to the key1 is updated to m. Subsequently, the network device extracts the packet 3 from the buffer queue, and schedules the packet 3 to the egress queue. Because the flowkey of the packet 3 is the key2, the network device subtracts 1 from the packet quantity n+1 corresponding to the key2 in the flow table, so that the packet quantity corresponding to the key2 is updated to n.

Figure 13:
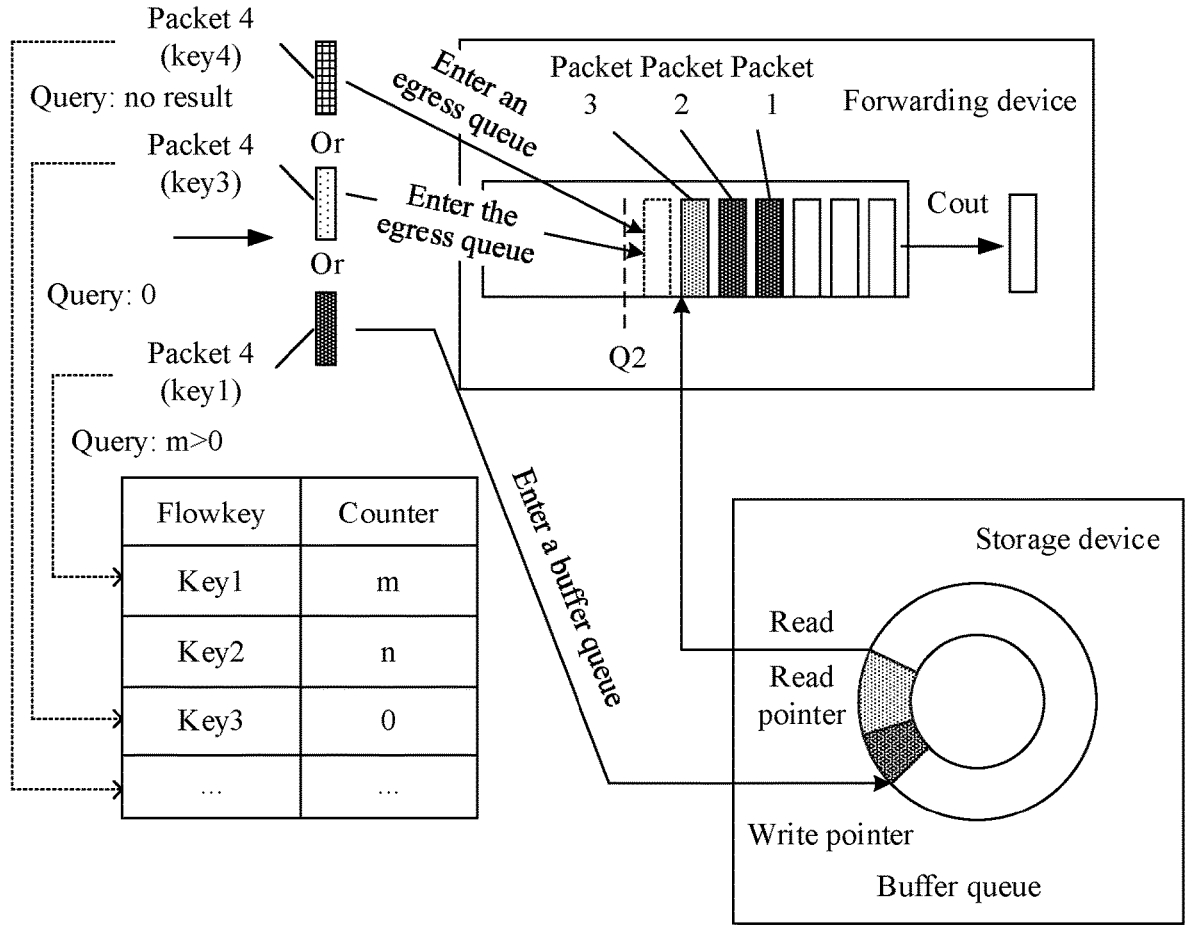
FIG. 13 is a schematic diagram of scheduling a received packet by a network device after congestion of an egress queue is relieved according to an embodiment of this disclosure.
Figure 14:
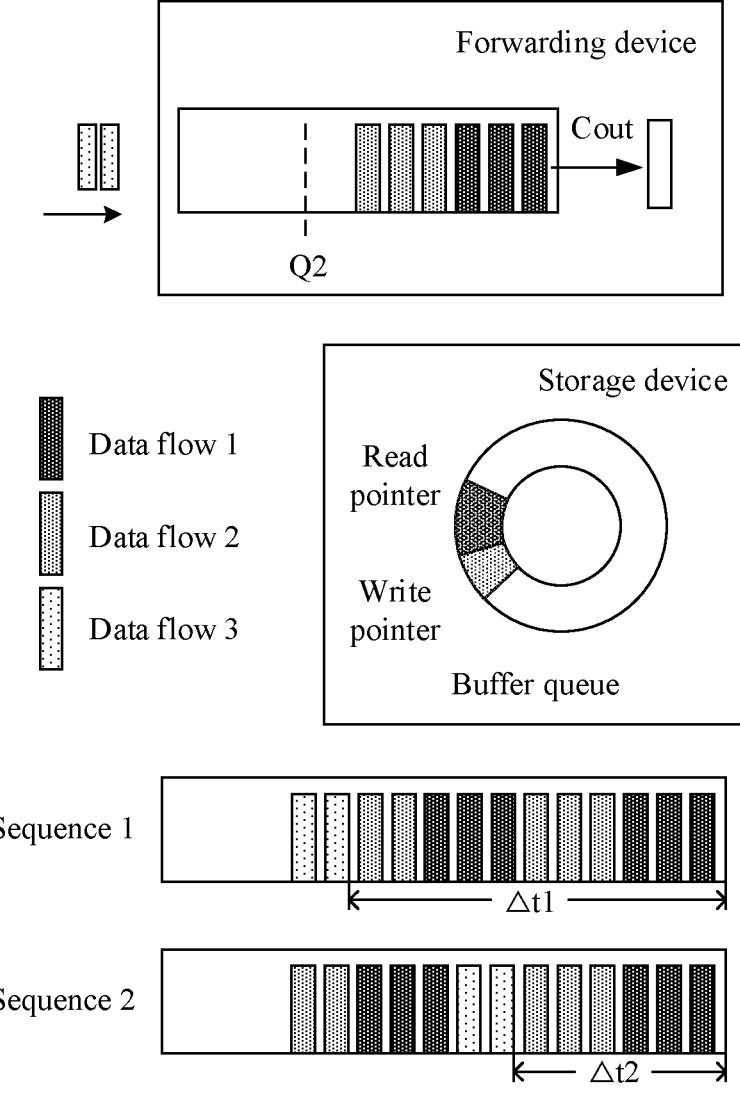
FIG. 14 is a schematic diagram of a technical effect of Embodiment 1 of this disclosure.

FIG. 13 is a schematic diagram of scheduling the received packet by the network device after congestion of the egress queue is relieved. As shown in FIG. 13 and FIG. 14, in the process in which the network device extracts the packet from the buffer queue, if the network device receives a packet 4 from the upstream node, the network device may obtain a flowkey of the packet 4, query the flow table according to the flowkey of the packet 4, and obtain a packet quantity corresponding to the flowkey of the packet 4 in the flow table, to determine whether a previous packet that belongs to a same data flow as the packet 4 is buffered in the buffer queue.

In a specific implementation, if the flowkey of the packet 4 is not recorded in the flow table, it indicates that the previous packet that belongs to the same data flow as the packet 4 is not buffered in the buffer queue. If the flowkey of the packet 4 is recorded in the flow table, but the packet quantity corresponding to the flowkey is equal to 0, it can also indicate that the previous packet that belongs to the same data flow as the packet 4 is not buffered in the buffer queue. If the packet quantity corresponding to the flowkey of the packet 4 in the flow table is greater than 0, it indicates that the previous packet that belongs to the same data flow as the packet 4 is buffered in the buffer queue.

For example, when the flowkey of the packet 4 is the key1, because the flow table includes the key1, and the packet quantity corresponding to the key1 is m (m is greater than 0), the network device may determine that the previous packet is buffered in the buffer queue. When the flowkey of the packet 4 is a key3, although the flow table includes the key3, because a packet quantity corresponding to the key3 is 0, the network device may determine that the previous packet is not buffered in the buffer queue. When the flowkey of the packet 4 is a key4, because the flow table does not include the key4, the network device may determine that the previous packet is not buffered in the buffer queue.

Step S4041: When the storage device does not buffer the previous packet of the data flow, the network device schedules the packet to the egress queue, to forward the packet to a downstream node.

For example, as shown in FIG. 13, when the flowkey of the packet 4 is the key3, because a packet whose flowkey is the key3 is not buffered in the buffer queue, the network device schedules the packet 4 to the egress queue, dequeues the packet 4 from the egress queue according to the "first in first out" principle, and sends the packet 4 to the downstream node, instead of first buffering the packet 4 in the buffer queue.

Step S4042: When the storage device buffers the previous packet of the data flow, the network device sends the packet to the storage device for buffering.

For example, as shown in FIG. 13, when the flowkey of the packet 4 is the key1, because a packet whose flowkey is the key1 is buffered in the buffer queue, the network device sends the packet 4 to the storage device, to buffer the packet 4 in the buffer queue of the storage device.

With reference to FIG. 14, the following describes, by using an example, a technical effect of Embodiment 1 of this disclosure.

As shown in FIG. 14, it is assumed that at a moment when congestion of the egress queue is relieved, the egress queue includes some packets that are of a data flow 1 and a data flow 2 and that are to be dequeued, the buffer queue includes the other packets in the data flow 1 and the data flow 2, and the network device further receives a packet that belongs to a data flow 3 and that is from the upstream node. In this case, if the technical solution in Embodiment 1 of this disclosure is not used, the network device adds the packet to the egress queue according to a sequence 1 in FIG. 14. To be specific, the packet of the data flow 3 can be forwarded only after all packets of the data flow 1 and the data flow 2 shown in FIG. 14 are forwarded, and time during which the packet of the data flow 3 waits in the queue may be shown by Δt1 in FIG. 14. If the technical solution in Embodiment 1 of this disclosure is used, the network device adds the packet to the egress queue according to a sequence 2 in FIG. 14. To be specific, the data flow 3 can be forwarded after part of packets that are in the data flow 1 and the data flow 2 and that are included in the egress queue are forwarded, and the time during which the packet of the data flow 3 waits in the queue may be shown by Δt2 in FIG. 14. It is clear that Δt2 is less than Δt1. It can be learned that in the solution in this embodiment of this disclosure, when congestion of the egress queue of the network device is relieved, time consumed from arrival of a packet of a new data flow at the network device to forwarding of the packet to the downstream node can be reduced.

Embodiment 2

An embodiment of this disclosure provides a data buffering method, applied to a storage device. The storage device may be any storage device configured to temporarily buffer a packet during congestion of an egress queue of a forwarding device in FIG. 1 to FIG. 9, for example, a server, a computer host, or a NAS that establishes a communication connection to the forwarding device.

Figure 15:
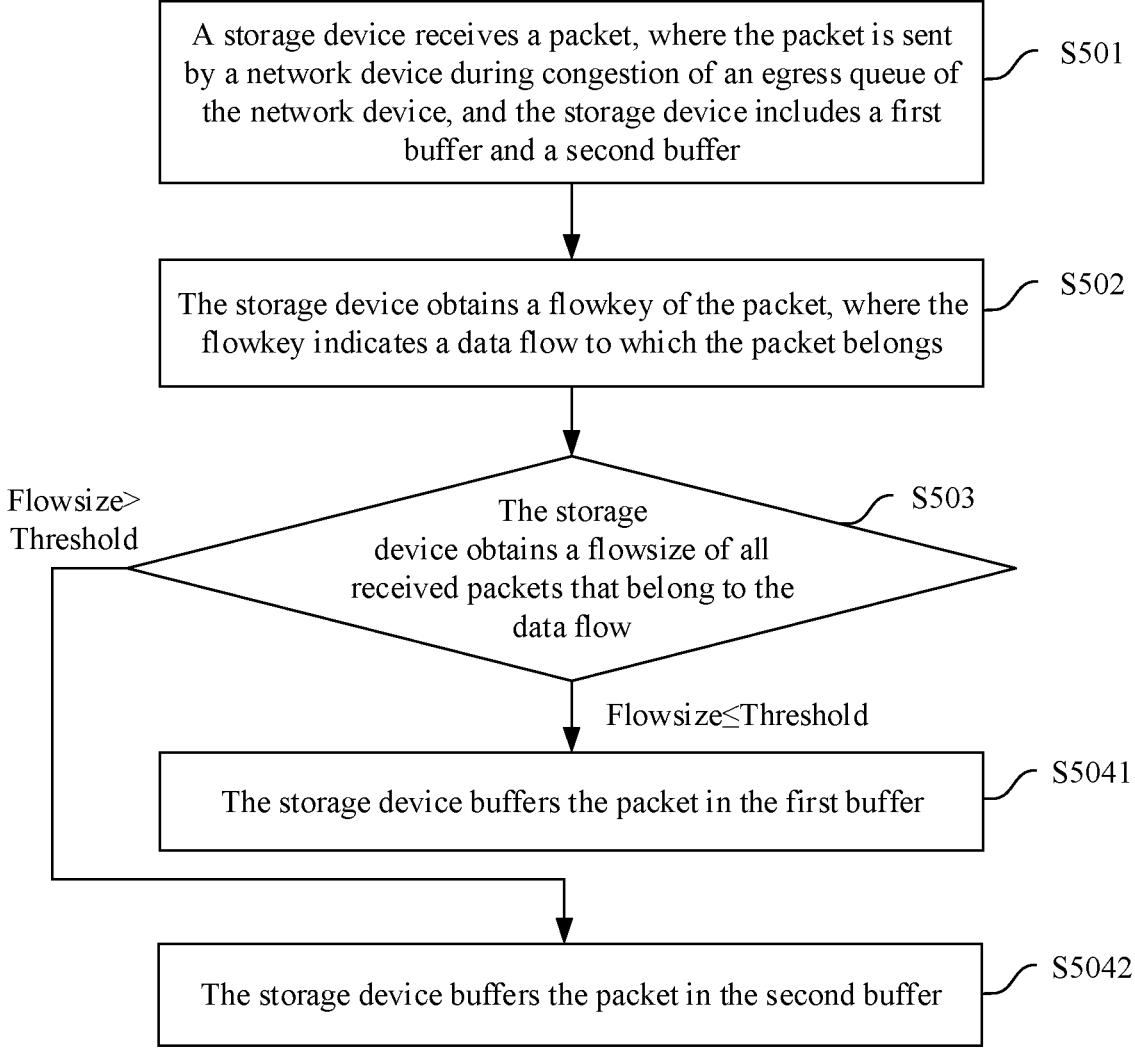
FIG. 15 is a schematic diagram of a data buffering method according to an embodiment of this disclosure.

As shown in FIG. 15, the method includes the following steps.

Step S501: The storage device receives a packet, where the packet is sent by a network device during congestion of an egress queue of the network device, and the storage device includes a first buffer and a second buffer.

The first buffer area may include one buffer queue, and the second buffer area may include another buffer queue. For ease of description, in this embodiment of this disclosure, the buffer queue in the first buffer area is referred to as a first buffer queue, and the buffer queue in the second buffer area is referred to as a second buffer queue. The first buffer queue and the second buffer queue may be ring buffer queues established according to a "first in first out" principle.

The first buffer queue and the second buffer queue are associated with the egress queue of the network device, and is used to buffer a packet that cannot be accommodated by the egress queue during congestion of the egress queue. The packet is sent by the network device to the storage device during congestion of the egress queue of the network device. The storage device allocates the packet to the first buffer queue or the second buffer queue.

Step S502: The storage device obtains a flowkey of the packet, where the flowkey indicates a data flow to which the packet belongs.

Step S503: The storage device obtains a flowsize of all received packets that belong to the data flow.

In a specific implementation, the storage device may record a flowsize of packets that belong to each data flow and that are received from the network device.

For example, as shown in Table 2, the storage device may record, in a flow table, the flowsize of the packets that belong to each data flow and that are received from the network device, where the flow table includes at least one entry, and each entry includes one flowkey and a packet flowsize corresponding to the flowkey. For example, a flowsize corresponding to a data flow key1 is size1, a flowsize corresponding to a data flow key2 is size2, and the like.

TABLE 2

| Flowkey | Flowsize |
| --- | --- |
| key1 | size1 |
| key2 | size2 |
| key3 | size3 |
| . . . | . . . |

The packet flowsize may be collected in bytes. The unit includes but is not limited to byte, kilobyte (KB), megabyte (MB), and the like.

Figure 16:
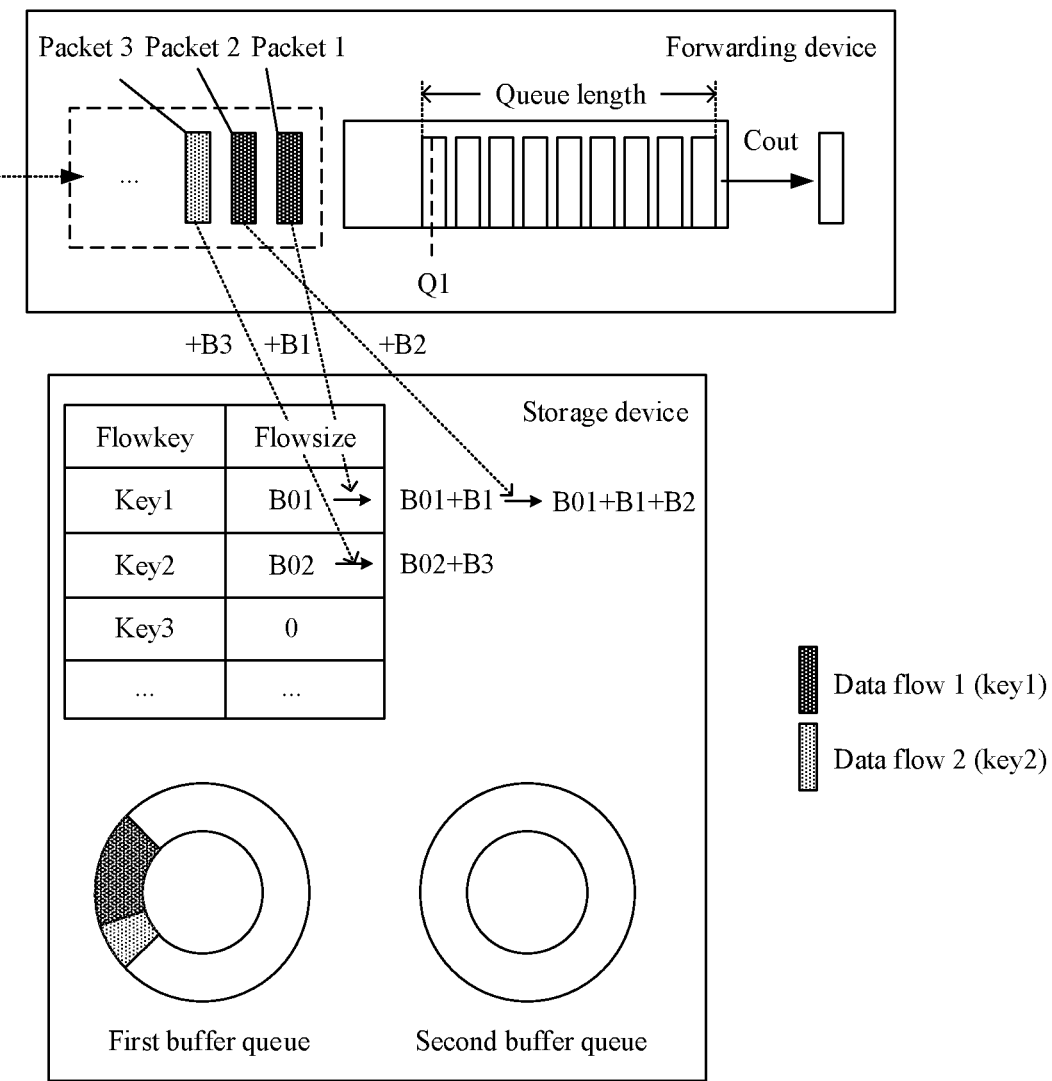
FIG. 16 is a schematic diagram of recording a packet flowsize by a storage device according to an embodiment of this disclosure.

With reference to FIG. 16, the following first describes an example of a process in which the storage device records the packet flowsize.

As shown in FIG. 16, when a packet 1 arrives at the storage device, if a flowkey of the packet 1 that is obtained through hash calculation performed by the storage device on a 5-tuple of the packet 1 is a key1, the storage device determines whether the key1 exists in the flow table. If the flow table already includes an entry of the key1, the storage device performs, based on a flowsize B1 of the packet 1, accumulation update on a flowsize corresponding to the key1 in the flow table, to be specific, adds the flowsize B1 of the packet 1 to an original flowsize that is assumed to be B01, to obtain a new flowsize B01+B1. If the flow table does not include the entry of the key1, the storage device creates the entry of the key1, and updates the flowsize of the key1 entry to the B1.

As shown in FIG. 16, when a packet 2 arrives at the storage device after the packet 1, if a flowkey of the packet 2 that is obtained through hash calculation performed by the storage device on a 5-tuple of the packet 2 is the key1, the storage device performs, based on a flowsize B2 of the packet 2, accumulation update on the flowsize corresponding to the key1 in the flow table again, to be specific, adds the flowsize B2 of the packet 2 to the flowsize B01+B1, to obtain a new flowsize B01+B1+B2.

As shown in FIG. 16, when a packet 3 arrives at the storage device after the packet 2, if a flowkey of the packet 3 that is obtained through hash calculation performed by the storage device on a 5-tuple of the packet 3 is a key2, the storage device determines whether the key2 exists in the flow table. If the flow table already includes an entry of the key2, the storage device performs accumulation update on a flowsize corresponding to the key2 in the flow table based on a flowsize B3 of the packet 3, to be specific, adds the flowsize B3 of the packet 3 to an original flowsize B02, to obtain a new flowsize B02+B3. If the flow table does not include the entry of the key2, the storage device creates the entry of the key2, and updates the flowsize of the key2 entry to the B3.

It should be additionally noted that in this embodiment of this disclosure, each time the storage device receives a packet, the storage device updates the flow table, and the process of updating the flow table occurs before the packet is buffered in the first buffer queue or the second buffer queue.

Figure 17:
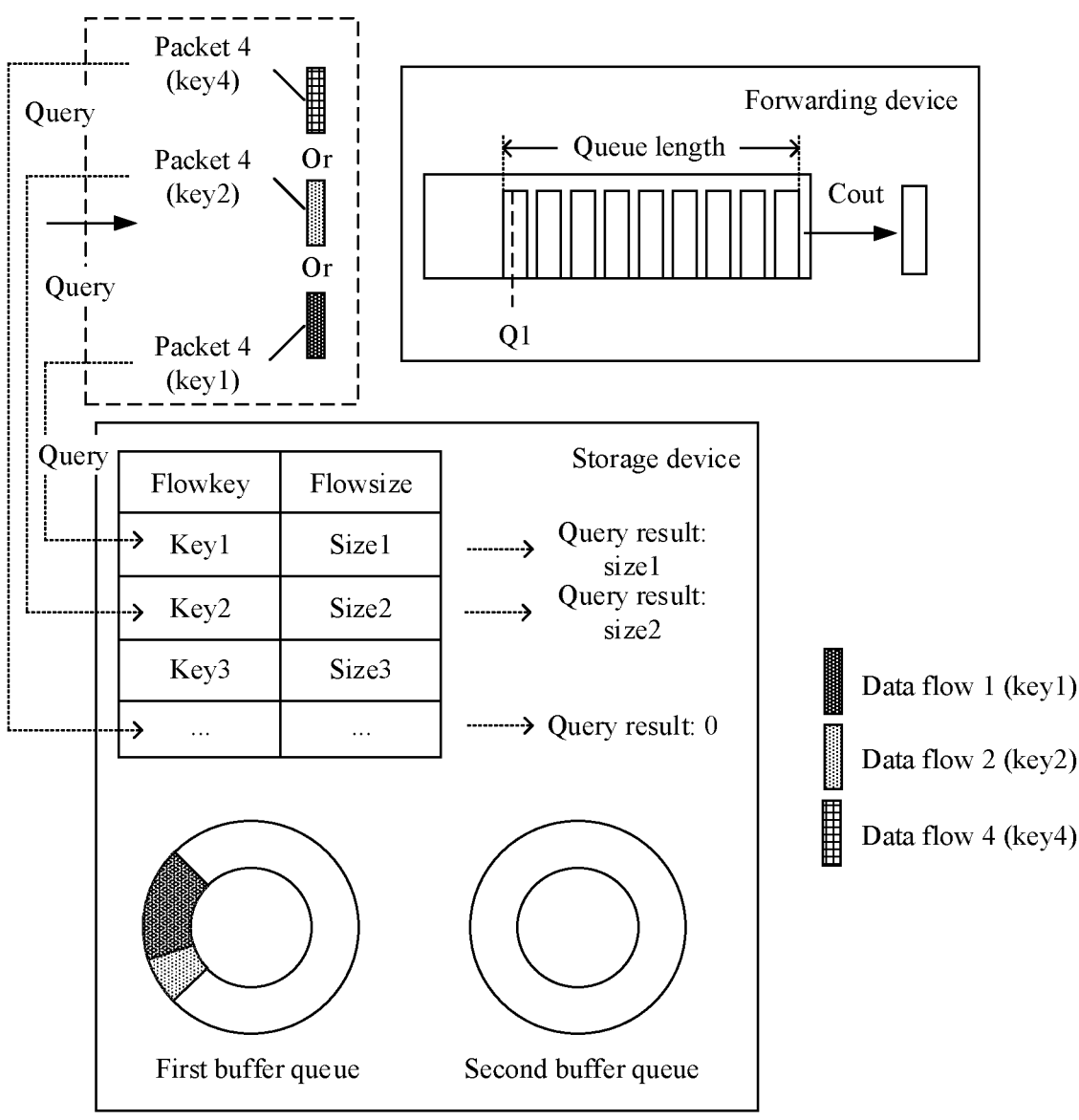
FIG. 17 is a schematic diagram of querying a packet flowsize corresponding to a flowkey by a storage device according to an embodiment of this disclosure.

Based on the flow table obtained by the storage device through collection, with reference to FIG. 17, the following describes an example of a process in which the storage device obtains, according to the flowkey of the received packet, the flowsize of all the received packets that belong to the data flow indicated by the flowkey in step S503.

As shown in FIG. 17, when receiving a packet 4, the storage device may query the flow table according to a flowkey of the packet 4, to obtain a flowsize of all packets that are received by the storage device and that belong to a same data flow as the packet 4.

For example, if the flowkey of the packet 4 is the key1, a corresponding flowsize that can be obtained by querying the flow table is a size1. If the flowkey of the packet 4 is key2, the corresponding flowsize that can be obtained by querying the flow table is a size2. If the flowkey of the packet 4 is a key4, because the flow table does not record an entry of the key4, the flowsize that can be obtained by querying the flow table is 0.

Step S5041: When a flowsize is less than or equal to a preset threshold, the storage device buffers the packet in the first buffer.

In this embodiment of this disclosure, the first buffer is configured to buffer a data flow with a flowsize less than or equal to a preset threshold W (referred to as a small flow), and the second buffer is configured to buffer a data flow with a flowsize greater than the preset threshold W (referred to as a large flow). One data flow includes a plurality of packets, and these packets arrive at the buffer device at different moments. Therefore, the flowsize of each data flow recorded in the flow table accumulates over time, and the flowsize of each data flow is less than or equal to the preset threshold W at an initial stage of the recording.

When a recorded flowsize of a data flow is less than or equal to the threshold W, the buffer device determines the data flow as the small flow by default, and therefore buffers a packet that belongs to the data flow in the first buffer.

Figure 18:
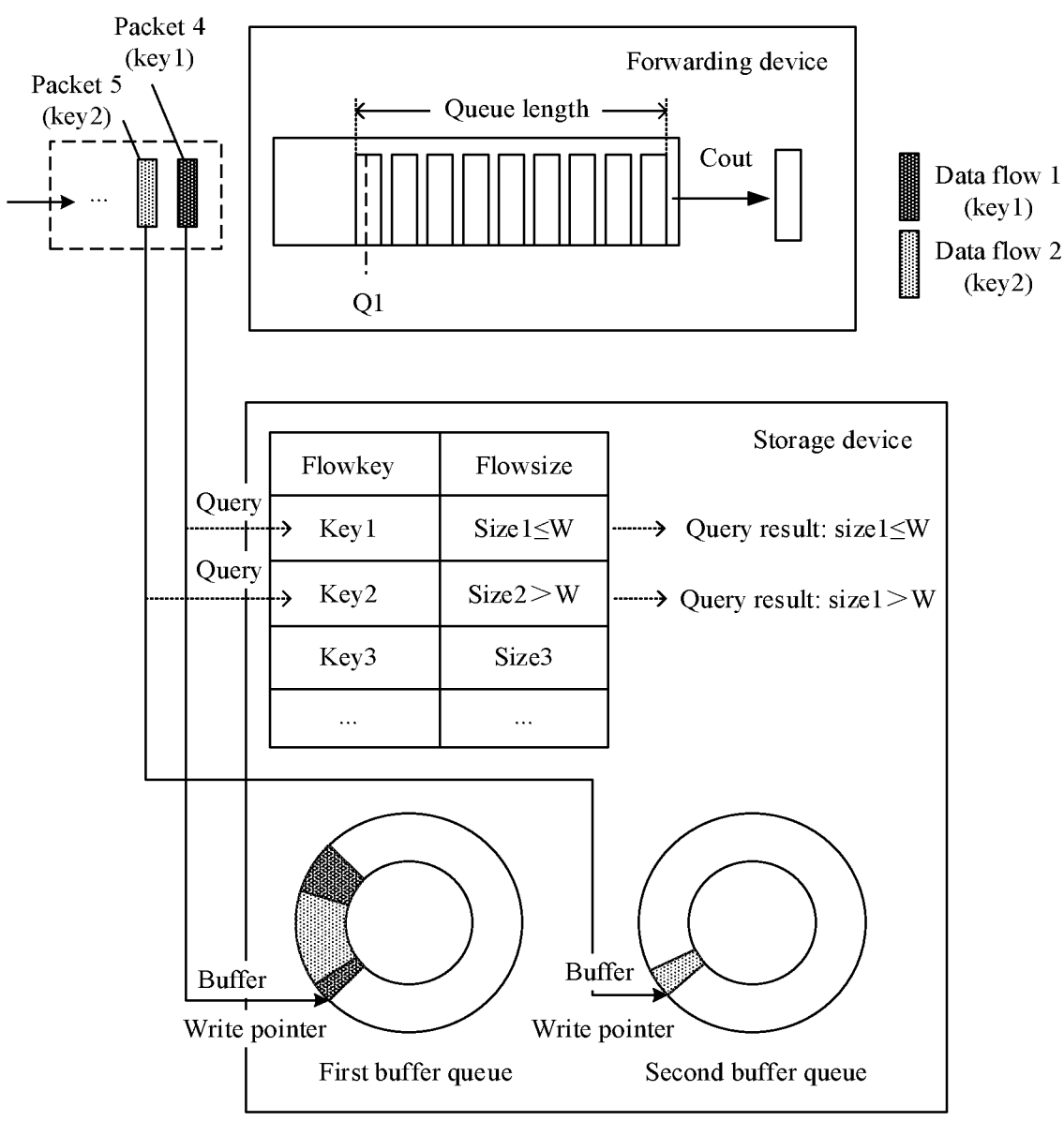
FIG. 18 is a schematic diagram of buffering a packet in a first buffer queue by a storage device according to an embodiment of this disclosure.

For example, as shown in FIG. 18, it is assumed that the flowkey of the packet 4 is the key1, and the storage device determines, by querying the flow table, that the flowsize size1 corresponding to the key1 is less than or equal to the preset threshold W, the storage device buffers the packet 4 in the first buffer queue.

A unit of the preset threshold W may be byte, and includes but is not limited to byte (B), KB, MB, and the like. For example, the preset threshold W is 100 B, 100 KB, 100 MB, or the like. A value of the preset threshold W is not limited in this embodiment of this disclosure. When implementing this embodiment of this disclosure, a person skilled in the art may determine the value of the preset threshold W based on the definitions of the large flow and the small flow.

Step S5042: When the flowsize is greater than the preset threshold, the storage device buffers the packet in the second buffer.

The flowsize of each data flow recorded in the flow table increases over time, and flowsizes of some data flows becomes greater than the preset threshold W and have a property of the large flow. Therefore, starting from a moment at which a flowsize of a data flow becomes greater than the threshold W, all packets that arrive subsequently and that belong to the data flow are buffered in the second buffer queue.

For example, as shown in FIG. 18, when the storage device receives a packet 5, if a flowkey of the packet 5 is the key2, and the storage device determines, by querying the flow table, that the flowsize size2 corresponding to the key2 is greater than the preset threshold W, the storage device buffers the packet 5 in the second buffer queue.

In this embodiment of this disclosure, after congestion of the egress queue of the network device is relieved, the storage device sends the packet in the first buffer to the network device. In a specific implementation, when the network device needs to send a packet obtained from the storage device to the egress queue, the storage device first sends the packet in the first buffer queue to the network device according to the "first in first out" principle, and then sends the packet in the second buffer queue to the network device after the first buffer queue is completely empty.

It should be additionally noted that the flow table in this embodiment of this disclosure cumulatively records the flowsize of each data flow, to determine whether the packet received by the storage device from the network device during congestion of the egress queue of the network device belongs to the large flow or the small flow, and the large flow and the small flow are buffer in different buffer queues. After congestion of the egress queue of the network device is relieved, the packet of the small flow is sent to the network device. It can be learned that the correspondence between the flowsizes recorded in the flow table and congestion of the network device is a one-time correspondence. Therefore, in this embodiment of this disclosure, an aging mechanism may be added for the flowsizes recorded in the flow table, to avoid recoding expired data and data expansion in the flow table. In a specific implementation, the aging mechanism is as follows. For example, after all the packets buffered in the storage device are sent to the network device (that is, after the first buffer queue and the second buffer queue are completely empty), the storage device clears the entries in the flow table, so that the flow table is reset. Alternatively, after all the packets buffered in the storage device are sent to the network device, the storage device determines whether there is no new packet arriving at the storage device within preset duration. If no new packet arrives at the storage device, the storage device clears the entries in the flow table, so that the flow table is reset.

With reference to FIG. 19, the following describes, by using an example, a technical effect of Embodiment 2 of this disclosure.

As shown in FIG. 19, it is assumed that during sending congestion of the egress queue, packets sequentially sent by the network device to the storage device belong to three data flows, for example, a data flow 1, a data flow 2, and a data flow 3. The data flow 3 is sent after the data flow 1 and the data flow 2. In addition, according to the definitions in this embodiment of this disclosure, the data flow 1 and the data flow 2 are large flows, and the data flow 3 is the small flow. In this case, if the technical solution in Embodiment 2 of this disclosure is not used, the storage device buffers the data flow 1, the data flow 2, and the data flow 3 in one ring buffer queue, and sends the buffered packets to the network device according to the "first in first out" principle after congestion of the egress queue is relieved, so that the packets of the data flow 1, the data flow 2, and the data flow 3 are added to the egress queue according to a sequence 3 in FIG. 19. Time in which the packets of the data flow 3 wait in the queue may be shown by Δt3 in FIG. 19. If the technical solution in Embodiment 1 of this disclosure is used, the storage device buffers part of the data flow 1 that is first received, part of the data flow 2 that is first received, and the data flow 3 in the first buffer, and buffers the other part of the data flow 1 and the other part of the data flow 2 that are received in the second buffer. After congestion of the egress queue is relieved, the packets in the first buffer queue are sent to the network device according to the "first in first out" principle, and after the first buffer queue is completely empty, the packets in the second buffer queue are sent to the network device, so that the packets of the data flow 1, the data flow 2, and the data flow 3 are added to the egress queue according to a sequence 4 in FIG. 19. Time in which packets of the data flow 3 wait in the queue may be shown by Δt4 in FIG. 19. Obviously, Δt4 is less than Δt3. It can be learned that, in the solution in this embodiment of this disclosure, when congestion of the egress queue of the network device is relieved, time in which the packets of the small flow wait in the egress queue can be reduced, efficiency of forwarding the small flow by the network device can be improved, and device performance can be improved.

In the foregoing embodiments provided in this disclosure, solutions of the data forwarding method and the data buffering method provided in this disclosure are separately described from perspectives of devices and interaction between the devices. It may be understood that, to implement the foregoing functions, each device, for example, the network device and the storage device, includes a corresponding hardware structure and/or software module for performing the functions. A person skilled in the art should be easily aware that, with reference to units and algorithm steps in the examples described in embodiments disclosed in this specification, this disclosure can be implemented in a form of hardware or a combination of hardware and computer software. Whether a function is performed by hardware or hardware driven by computer software depends on particular applications and design constraints of the technical solution. A person skilled in the art may use different methods to implement the described functions for each particular application, but it should not be considered that such an implementation goes beyond the scope of this disclosure.

For example, the foregoing device implements a corresponding function by using a software module.

Figure 20:
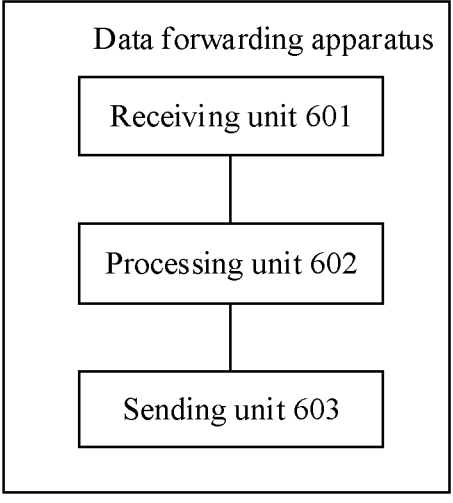
FIG. 20 is a schematic diagram of a data forwarding apparatus according to an embodiment of this disclosure.

In an embodiment, as shown in FIG. 20, a data forwarding apparatus configured to implement a function of an action of the foregoing network device includes that a receiving unit 601 configured to receive a packet sent by an upstream node after congestion of an egress queue is relieved, a processing unit 602 configured to obtain a flowkey of the packet, where the flowkey indicates a data flow to which the packet belongs, and the processing unit 602 is further configured to determine, based on the flowkey, whether a previous packet belonging to the data flow is buffered in a storage device associated with the egress queue, and a sending unit 603 configured to schedule the packet to the egress queue when the storage device does not buffer the previous packet of the data flow, to forward the packet to a target node, where the storage device is configured to buffer a packet that is received by the network device during congestion of the egress queue of the network device.

Based on the foregoing apparatus, after congestion of the egress queue is relieved, if the network device receives the packet sent by an upstream device, the network device determines whether the storage device buffers the previous packet that belongs to the same data flow as the packet. If the storage device does not buffer the previous packet, the network device may determine that the packet belongs to a new data flow. In this case, to avoid affecting forwarding performance of the new data flow, the network device directly schedules the packet to the egress queue, to implement queue jumping. Therefore, in the solution in this embodiment of this disclosure, when congestion of the egress queue of the network device is relieved, time consumed from the arrival of the packet of the new data flow at the network device to the forwarding of the packet to a downstream node can be reduced, and forwarding performance of the network device can be improved.

Optionally, the sending unit 603 is further configured to send the packet to the storage device for buffering when the storage device buffers the previous packet of the data flow. Therefore, if the storage device buffers the previous packet, the network device may determine that the packet belongs to a data flow that has been buffered in the storage device. Therefore, to prevent packet disorder in the data flow, the network device sends the packet to the storage device for buffering.

Optionally, the sending unit 603 is further configured to send the received packet to the storage device for buffering during congestion of the egress queue. In this way, packet drop caused by congestion or full occupation of the egress queue is avoided.

Optionally, the processing unit 602 is further configured to record a quantity of packets of each data flow that are buffered in the storage device. Therefore, after congestion of the egress queue is relieved, the network device determines, based on the recorded packet quantity, whether the network device continues to send a newly received packet to the storage device for buffering.

Optionally, the processing unit 602 is further configured to record, in a flow table, the quantity of packets of each data flow that are buffered in the storage device, where the flow table includes at least one entry, and each entry includes one flowkey and a packet quantity corresponding to the flowkey. Therefore, the network device may obtain, by querying the flow table, the quantity of packets of each data flow that are buffered in the storage device.

Optionally, the processing unit 602 is further configured to query the flow table based on the flowkey, to obtain the packet quantity corresponding to the data flow in the flow table, and when the packet quantity is equal to 0, determine that the storage device currently does not buffer the previous packet of the data flow, or when the packet quantity is greater than 0, determine that the storage device currently buffers the previous packet of the data flow.

Figure 21:
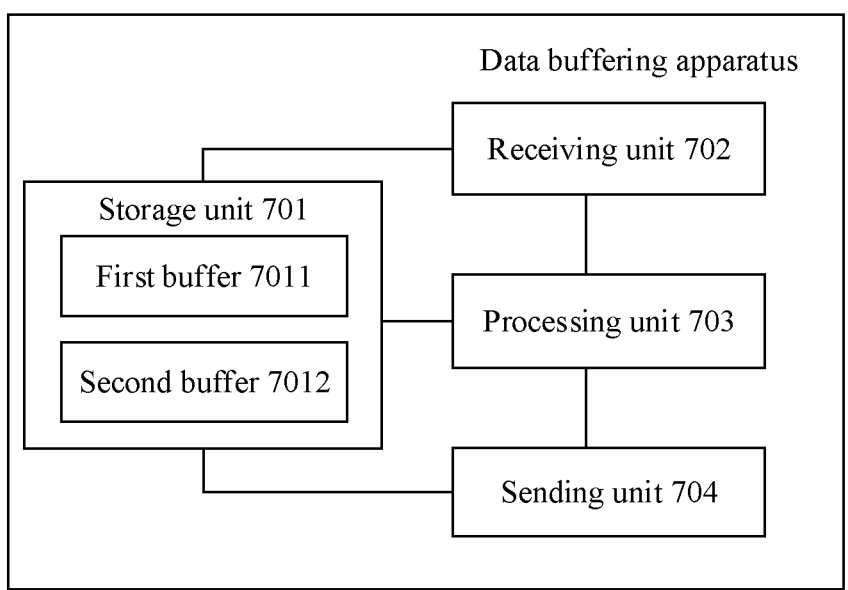
FIG. 21 is a schematic diagram of a data buffering apparatus according to an embodiment of this disclosure.

In an embodiment, as shown in FIG. 21, a data forwarding apparatus configured to implement a function of an action of the foregoing network device includes a storage unit 701, including a first buffer 7011 and a second buffer 7012, a receiving unit 702 configured to receive a packet, where the packet is sent by the network device during congestion of an egress queue of the network device, a processing unit 703 configured to obtain a flowkey of the packet, where the flowkey indicates a data flow to which the packet belongs, the processing unit 703 is further configured to obtain a flowsize of all packets that are received by the apparatus and that belong to the data flow, and the processing unit 703 is further configured to buffer the packet in the first buffer 7011 when the flowsize is less than or equal to a preset threshold, and a sending unit 704 configured to send the packet in the first buffer 7011 to the network device after congestion is relieved.

Based on the foregoing apparatus, during sending congestion of the egress queue of the network device, a storage device determines whether a packet received from the network device belongs to a large flow or a small flow. If the packet belongs to the small flow, the storage device buffers the packet in the first buffer. If the packet belongs to the large flow, the storage device buffers the packet in the second buffer. After congestion of the egress queue of the network device is relieved, the storage device sends the packet to the egress queue from the first buffer. Therefore, according to the solution in this embodiment of this disclosure, when congestion of the egress queue of the network device is relieved, time in which the packet of the small flow waits in the egress queue can be reduced, efficiency of forwarding the small flow by the network device can be improved, and device performance can be improved.

Optionally, the processing unit 703 is further configured to buffer the packet in the second buffer 7012 when the flowsize is greater than the preset threshold. Therefore, when the flowsize is greater than the threshold, the storage device determines that the data flow to which the packet belongs is the large flow, and buffers the packet in the second buffer.

Optionally, the processing unit 703 is further configured to record a flowsize of packets that belong to each data flow and that are received from the network device. Therefore, the storage device may determine, based on the recorded flowsizes, whether the received packet belongs to the large flow or the small flow.

Optionally, the processing unit 703 is further configured to record, in a flow table, the flowsize of the packets that belong to each data flow and that are received from the network device, where the flow table includes at least one entry, and each entry includes one flowkey and a packet flowsize corresponding to the flowkey. Therefore, the storage device may obtain, by querying the flow table, the flowsize of the packets of each data flow that are buffered in the storage device.

Optionally, the processing unit 703 is further configured to update the flow table before buffering the packet. Therefore, each time the storage device receives a packet, the storage device updates the flow table based on a size of a received packet, to implement real-time update of the flow table.

In addition, for example, the device implements a corresponding function by using a hardware module.

In an embodiment, the foregoing functions of the network device may be implemented by using the structure shown in FIG. 2. For example, the interface unit 230 is configured to receive a packet sent by an upstream node, and forward the packet to a downstream node or a storage device. The memory 120, or the memory 220, or both are configured to store computer program code, where the computer program code includes computer instructions. When the processor 110, or the processor 220, or both execute the computer instructions, the network device is enabled to perform the method in the foregoing embodiments, for example obtaining a flowkey of the packet, determining, based on the flowkey, whether the storage device associated with an egress queue buffers a previous packet that belongs to a data flow, and scheduling the packet to the egress queue when the storage device does not buffer the previous packet of the data flow.

In another embodiment, the foregoing functions of the network device may be implemented by using the hardware structure shown in FIG. 3. For example, the communications interface 320 is configured to receive a packet sent by an upstream node, and forward the packet to a downstream node or a storage device. The memory 310 is configured to store computer program code, where the computer program code includes computer instructions. When the processor 310 executes the computer instructions, the network device is enabled to perform the method in the foregoing embodiments, for example obtaining a flowkey of the packet, determining, based on the flowkey, whether the storage device associated with an egress queue buffers a previous packet that belongs to a data flow, and scheduling the packet to the egress queue when the storage device does not buffer the previous packet of the data flow.

In another embodiment, the foregoing functions of the storage device may be implemented by using the hardware structure shown in FIG. 3. For example, the communications interface 320 is configured to receive a packet from the network device, and send the packet to the network device. The memory 310 may allocate a first buffer and a second buffer, and is configured to store computer program code, where the computer program code includes computer instructions. When the processor 310 executes the computer instructions, the storage device performs the method in the foregoing embodiments, for example, obtaining a flowkey of the packet, obtaining a flowsize of all received packets that belong to a data flow, buffering the packet in the first buffer when the flowsize is less than or equal to a preset threshold, or buffering the packet in the second buffer when the flowsize is greater than a preset threshold, and after congestion is relieved, sending the packet in the first buffer to the network device.

An embodiment of this disclosure further provides a computer storage medium. The computer storage medium stores computer instructions. When the computer instructions are run on a computer, the computer is enabled to perform the method in the foregoing aspects.

An embodiment of this disclosure further provides a computer program product including instructions. When the computer program product is run on a computer, the computer is enabled to perform the method in the foregoing aspects.

This disclosure further provides a chip system. The chip system includes a processor configured to support the foregoing apparatus or device in implementing a function in the foregoing aspects, for example, generating or processing information in the foregoing method. In a possible design, the chip system further includes a memory configured to store program instructions and data that are necessary for the foregoing apparatus or device. The chip system may include a chip, or may include a chip and another discrete component.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made based on the technical solutions of the present disclosure shall fall within the protection scope of the present disclosure.

What is claimed is:

1. A method implemented by a network device, the method comprising:

receiving, from an upstream node, one or more packets during congestion of an egress queue of the network device;

buffering the one or more packets in a storage device associated with the egress queue;

receiving, from the upstream node, a first packet after the congestion is relieved;

obtaining a first flowkey of the first packet, wherein the first flowkey indicates a first data flow to which the first packet belongs;

determining, based on the first flowkey, whether a previous packet belonging to the first data flow is buffered in the storage device; and scheduling the first packet to the egress queue to forward the first packet to a downstream node when the previous packet is not buffered in the storage device.

2. The method of claim 1, further comprising sending the first packet to the storage device for buffering when the previous packet is buffered in the storage device.

3. The method of claim 1, further comprising:

receiving a second packet; and buffering the second packet in the storage device during congestion of the egress queue.

4. The method of claim 1, further comprising recording a quantity of packets of each data flow that are buffered in the storage device.

5. The method of claim 4, further comprising recording, in a flow table, the quantity of the packets of each data flow that are buffered in the storage device, wherein the flow table comprises at least one entry, and wherein each of the at least one entry comprises a flowkey and a packet quantity corresponding to the flowkey.

6. The method of claim 5, further comprising:

querying, based on the first flowkey, the flow table to obtain the packet quantity corresponding to the first data flow in the flow table;

determining that the previous packet is not buffered in the storage device when the packet quantity is equal to zero; and determining that the previous packet is buffered in the storage device when the packet quantity is greater than zero.

7. A network device comprising:

a memory configured to store computer instructions; and a processor coupled to the memory and configured to execute the computer instructions to cause the network device to:

receive, from an upstream node, a one or more packets during congestion of an egress queue of the network device;

buffer the one or more packets in a storage device associated with the egress queue;

receive, from the upstream node, a first packet after the congestion is relieved;

obtain a first flowkey of the first packet, wherein the first flowkey indicates a first data flow to which the first packet belongs;

determine, based on the first flowkey, whether a previous packet belonging to the first data flow is buffered in the storage device; and schedule the first packet to the egress queue to forward the first packet to a downstream node when the previous packet is not buffered in the storage device.

8. The network device of claim 7, wherein the processor is further configured to execute the computer instructions to cause the network device to: send the first packet to the storage device for buffering when the previous packet is buffered in the storage device.

9. The network device of claim 7, wherein the processor is further configured to execute the computer instructions to cause the network device to:

receive a second packet; and buffer the second packet in the storage device during congestion of the egress queue.

10. The network device of claim 7, wherein the processor is further configured to execute the computer instructions to cause the network device to record a quantity of packets of each data flow that are buffered in the storage device.

11. The network device of claim 10, wherein the processor is further configured to execute the computer instructions to cause the network device to further record, in a flow table, the quantity of the packets of each data flow that are buffered in the storage device, wherein the flow table comprises at least one entry, and wherein each of the at least one entry comprises a flowkey and a packet quantity corresponding to the flowkey.

12. The network device of claim 11, wherein the processor is further configured to execute the computer instructions to cause the network device to:

query, based on the first flowkey, the flow table to obtain the packet quantity corresponding to the first data flow in the flow table;

determine that the previous packet is not buffered in the storage device when the second packet quantity is equal to zero; and determine that the previous packet is buffered in the storage device when the second packet quantity is greater than zero.

* * * * *